United States Patent [19]

Beckner et al.

[11] Patent Number: 4,596,010
[45] Date of Patent: Jun. 17, 1986

[54] DISTRIBUTED PACKET SWITCHING ARRANGEMENT

[75] Inventors: Mark W. Beckner, Morristown, N.J.; James A. Davis, Glen Ellyn, Ill.; Eric J. Gausmann, Long Valley, N.J.; Thomas L. Hiller, Berkley, Ill.; Philip D. Olson, Rohnert Park, Calif.; Gilbert A. Van Dine, West Chicago, Ill.

[73] Assignee: AT&T Bell Laboratories, Murray Hill, N.J.

[21] Appl. No.: 606,751

[22] Filed: May 3, 1984

[51] Int. Cl.⁴ .............................................. H04Q 11/04
[52] U.S. Cl. ...................................................... 370/60
[58] Field of Search .............................. 370/60, 94, 89

[56] References Cited

U.S. PATENT DOCUMENTS

| | | | |
|---|---|---|---|
| 3,573,740 | 4/1971 | Berger et al. ..................... | 340/172.5 |
| 4,154,983 | 5/1979 | Pedersen ................................. | 370/89 |
| 4,251,880 | 2/1981 | Baugh et al. .......................... | 370/89 |
| 4,314,335 | 2/1982 | Pezzi ................................... | 364/200 |
| 4,314,367 | 2/1982 | Bakka et al. .......................... | 370/60 |
| 4,347,498 | 8/1982 | Lee et al. ........................ | 340/825.02 |
| 4,392,222 | 7/1983 | Ando .................................... | 370/60 |
| 4,408,323 | 10/1983 | Montgomery ........................ | 370/60 |
| 4,413,337 | 11/1983 | Dauphin ............................... | 370/58 |
| 4,417,334 | 11/1983 | Gunderson et al. ................... | 370/85 |
| 4,491,947 | 1/1985 | Frank .................................... | 370/94 |
| 4,494,231 | 1/1985 | Slawy et al. .......................... | 370/60 |

OTHER PUBLICATIONS

ICC '80 International Conference on Communications; "An Architecture for a Flexible Integrated Voice/Data Switch"; Ross et al; Jun. 8-12, 1980; pp. 21.6.1-21.6.5.

M. Courvoisier, "A Programmable Arbiter for Multiprocessor Systems", *Digital Processes*, vol. 5, (1979), pp. 271-281.

M. Clost, A. Roche and A. Vomscheid, "Perspectives of Evolution Towards the Integrated Services Digital Networks", *IEEE*, 1982, pp. 31.51-31.58.

G. Tollusso and S. R. Treves, "Application of Distributed Control to Handling Non-Voice Services", *The Technical Journal of ITT*, vol. 56, No. 1, 1981.

D. V. Glen, "Integrated Services Digital Networks, Standards, and Related Technology", *U.S. Department of Commerce*, Jun. 1982, pp. 1-133.

D. Hardy, J. L. Dauphin, O. Louvet and G. Pays, "PALME: A Switching System Integrating Voice and Data", *ISS '81*, Montreal, Sep. 1981, pp. 1-6.

J. H. DeJean and H. Campagno, "Packet Switching Multiservice Network", *ISS '81*, Montreal, Sep. 1981, pp. 1-7.

R. Renoulin, "An Integrated Service Local Network for Distributed Access of Heterogeneous Terminals Made for Firm Management the Project Carthage", *IEEE*, 1982, pp. 35-39.

S. Giorcelli, L. Musumeci and M. Romagnoli, "ISDN Capabilities in a Digital Local Exchange", *CSELT Report*, vol. X, No. 6, Dec. 1982, pp. 407-412.

(List continued on next page.)

Primary Examiner—Douglas W. Olms
Assistant Examiner—Frank M. Scutch, III
Attorney, Agent, or Firm—Ross T. Watland

[57] ABSTRACT

An integrated packet switching and circuit switching system comprising a number of switching modules each connected to a corresponding plurality of user terminals. Each switching module includes a time-slot interchange unit for providing circuit-switched communication channels and a control unit that controls the operation of the time-slot interchange unit. Each switching module also includes a packet switching unit used both to provide packet-switched communication channels among the user terminals connected to that switching module, and to switch control information between the user terminals and the control unit to establish circuit-switched calls and packet-switched calls. A time-multiplexed switch interconnects the switching modules to provide circuit-switched communication channels and packet-switched communication channels between user terminals of different switching modules.

22 Claims, 29 Drawing Figures

OTHER PUBLICATIONS

D. DiPino and C. Mossotto, "The Role of Signalling and Protocols in the Emerging ISDN", *IEEE*, 1981, pp. 19.3.1–19.3.7.

H. Johansson, "DCA Communication System Access Protocol and Maintenance Aspects", *IEEE*, 1982, pp. 1184–1188.

F. H. Rees and D. Denman, "Message Transmission in the Network of System X Exchanges", *ISS '81*, Montreal, Sep. 1981, pp. 1–6.

J. B. Jacob and J. Nuttall, "The E10.B Digital Switching System: Towards the Integrated Services Digital Network (ISDN)", *ISS '81*, Montreal, Sep. 1981, pp. 1–6.

R. Montemurro and F. Villani, "Customer Access to the ISDN Facilities", *ISS '81*, Montreal, Sep. 1981, pp. 1–6.

R. Trubert and Y. Samoel, "A New Generation of Subscriber Connection Unit for the E10 Switching System", *Commutation & Transmission*, Sep. 1983, No. 3, pp. 139–150.

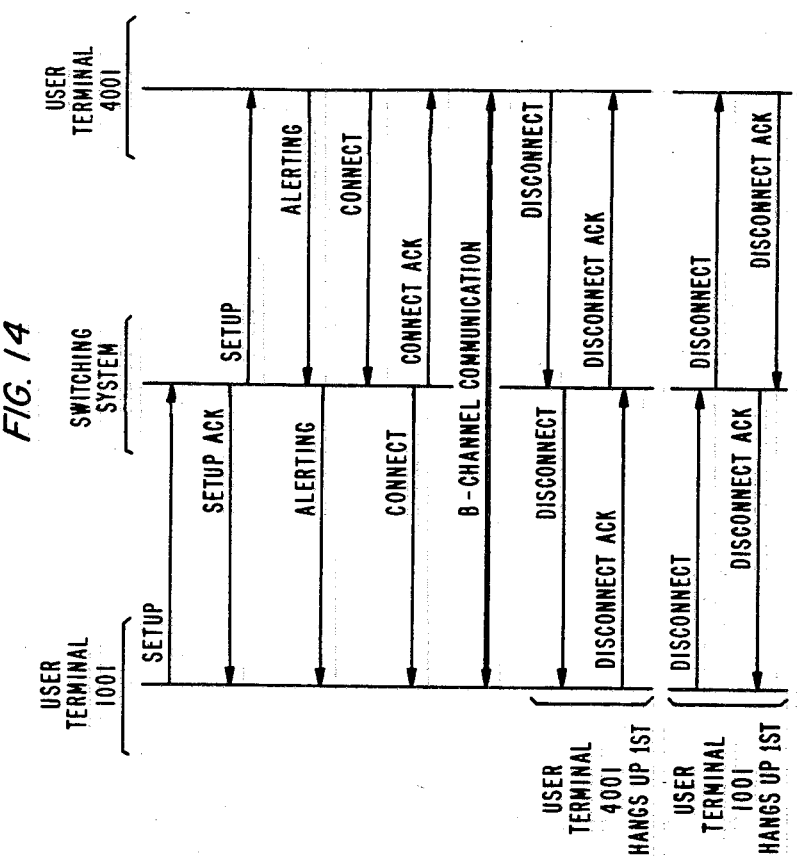

FIG. 17

| PROTOCOL HANDLER 1700-0 ROUTING TABLE | PROTOCOL HANDLER 1700-95 ROUTING TABLE |
|---|---|
| (LCN2, UT 1001) → (ILCN3) | (ILCN3, PH 1700-0) → (LCN2, UT 1002) |
| (LCN2, UT 1001) ← (ILCN8, PH 1700-95) | (ILCN8) ← (LCN2, UT 1002) |

FIG. 18

| PROTOCOL HANDLER 1700-0 ROUTING TABLE | PROTOCOL HANDLER 1700-1 ROUTING TABLE | PROTOCOL HANDLER 4700-1 ROUTING TABLE | PROTOCOL HANDLER 4700-0 ROUTING TABLE |
|---|---|---|---|
| (LCN2, UT 1001) → (ILCN9) | (ILCN9, PH 1700-0) → (IMLCN3) | (IMLCN3, PH 1700-1) → (ILCN14) | (ILCN14, PH 4700-1) → (LCN2, UT 4001) |
| (LCN2, UT 1001) ← (ILCN4, PH 1700-1) | (ILCN4) ← (IMLCN8, PH 4700-1) | (IMLCN8) ← (ILCN3, PH 4700-0) | (ILCN3) ← (LCN2, UT 4001) |

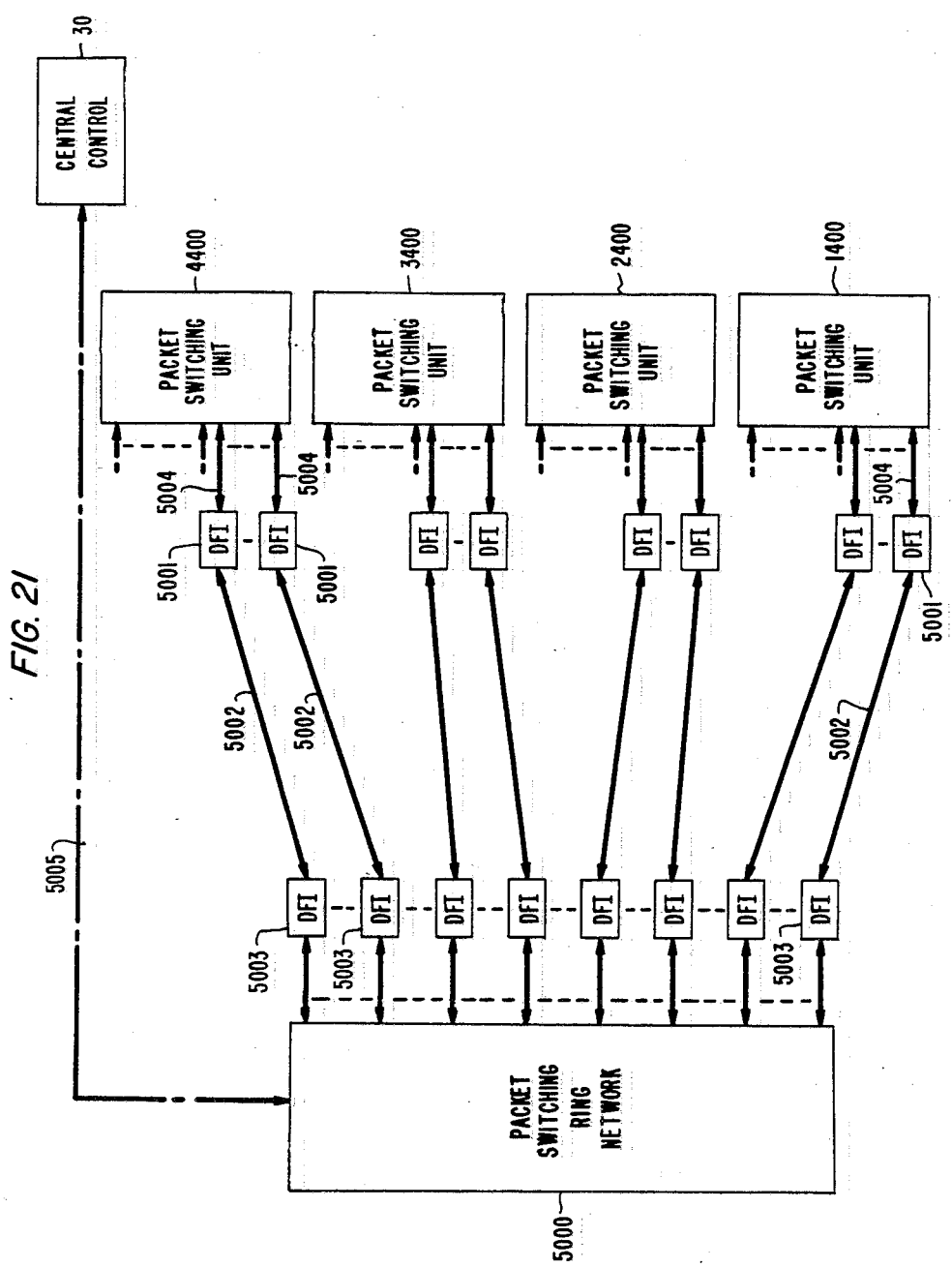

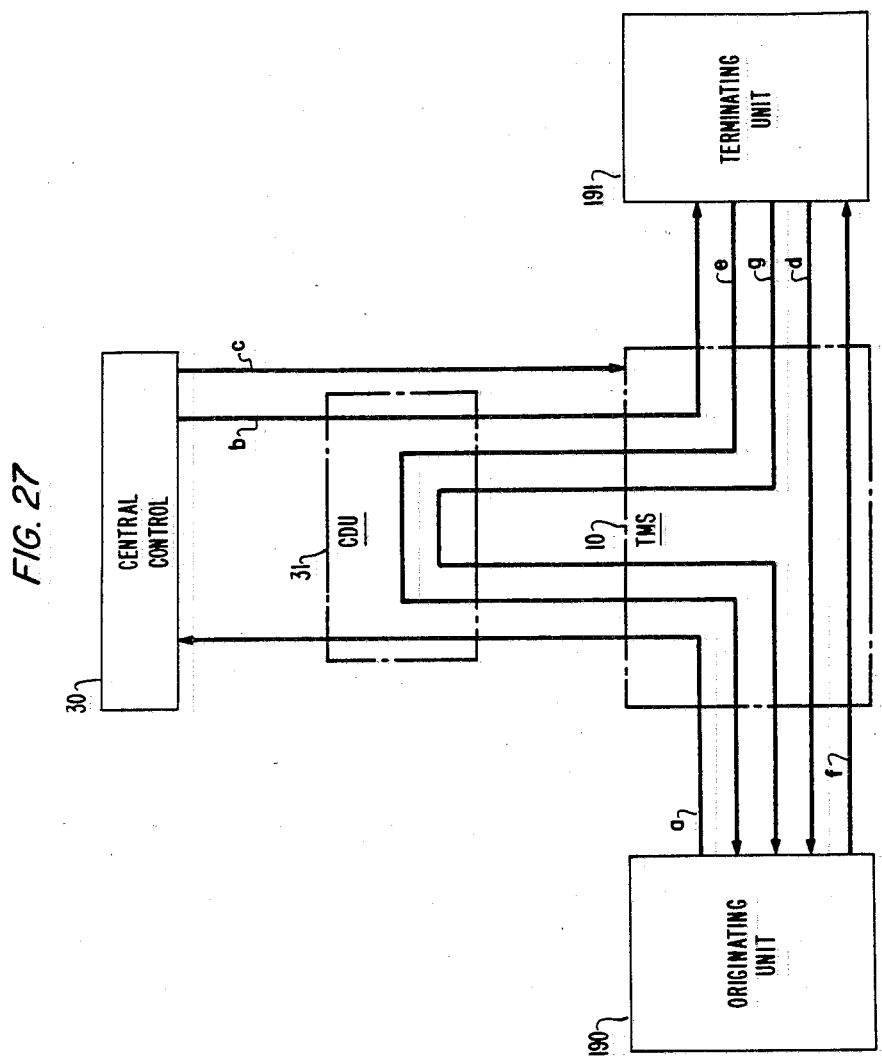

DISTRIBUTED PACKET SWITCHING ARRANGEMENT

CROSS-REFERENCE TO RELATED APPLICATION

This application is related to the application of M. W. Beckner, J. A. Davis, E. J. Gausmann, T. L. Hiller, P. D. Olson, and G. A. Van Dine, Ser. No. 606,937 filed May 3, 1984, entitled "Integrated Packet Switching and Circuit Switching System", which is assigned to the assignee of the present invention.

TECHNICAL FIELD

This invention relates to switching systems and, more particularly, to such systems that provide both packet switching and circuit switching service.

BACKGROUND OF THE INVENTION

With the extensive use of personal computers and other data processing facilities both at home and in the office, a need exists for providing voice and data transmission and switching capabilities on a widespread basis. This has led to the development of the concept of an integrated services digital network (ISDN)—a switched communications network providing end-to-end digital connectivity among network users where voice and data services are provided over the same transmission and switching facilities. Because of the different characteristics of voice and data traffic—voice being typically continuous in one direction for relatively long intervals and tolerant of noise but sensitive to variations in delay, and data being bursty and sensitive to errors but tolerant of moderate delays and delay variations—two fundamentally different switching techniques have been traditionally applied. Circuit switching, where switched connections between users are dedicated for call duration, is the basis of the present-day switched voice telecommunication network. On the other hand, packet switching, where data packets from many calls share a single, high-speed line and are switched based on logical channel numbers included in the packets, was pioneered in the ARPANET network of the U.S. Department of Defense, and has now been implemented in a variety of public data networks.

The approach most commonly used at present to serve customers that have both voice and data requirements is to use separate networks and separate access lines for the two types of traffic. Since both voice and data access lines are typically utilized only a fraction of the time, the duplication of equipment involved in this approach is wasteful and costly compared to an arrangement where facilities could be shared. Some presently available equipment multiplexes both voice and data onto the same access lines. Even if the access lines are shared, however, the voice and data, which are typically transmitted in very different formats, must each be switched to their proper destinations. One approach to the provision of such switching is to use entirely separate packet and circuit switches. This approach, however, is also unnecessarily duplicative. From the line circuits inward, the two information types are served by separate equipment. A primary reason for using this approach is the technical difficulty of handling these two radically different types (and formats) of traffic in an efficient, integrated manner.

Another approach to the problem is to include a centralized, packet switching entity in the switching system and to route all packet traffic from the system users to that centralized entity. However, if circuit switching resources otherwise available for voice calls are used to convey such packet traffic, the switching system voice call capacity is reduced by an amount dependent on the level of packet traffic. Furthermore, the initial cost and complexity of incorporating such a centralized, packet switching entity into the architecture of a circuit switching system is substantial in view of the likely gradual increase in the number of system users requiring packet switching service.

In view of the foregoing, a recognized problem in the art is the difficulty in providing packet switching service to the users of an ISDN switching system in a manner that avoids the inefficiency of unnecessary duplication of equipment and that also minimizes the effect of packet traffic on the circuit-switched call capacity of the system and allows incremental growth in the packet switching capacity of the system as the number of users increases, with minimal impact on the overall system architecture.

SUMMARY OF THE INVENTION

The aforementioned problem is solved and a technical advance is achieved in accordance with the principles of the invention in a switching arrangement wherein packet switching units are distributed to only those switching modules serving users requiring packet switching service, and each such unit advantageously provides packet-switched communication channels among the users served by that switching module without routing packets to a centralized entity. Only packet calls between users connected to different switching modules are completed via an inter-module connection unit that interconnects all the switching modules of the system.

A switching system in accordance with the invention includes a number of switching modules each associated with a corresponding group of user terminals. The switching modules are inrerconnected by an inter-module connection unit, e.g., a time-multiplexed switch. Each of the switching modules includes a circuit-switching unit, e.g. a time-slot interchange unit, and a packet switching unit. The circuit switching units provide circuit-switched communication channels for traffic within a module and similar channels to the inter-module connection unit for circuit-switched traffic between modules. Likewise, the packet-switching units provide packet-switched communication channels for packet-switched traffic within a module and similar channels to the inter-module connection unit for packet-switched traffic between modules.

In accordance with an exemplary embodiment of the invention, each of the switching modules further includes a bidirectional data bus that couples the packet switching unit to the time-slot interchange unit. The time-slot interchange unit provides predetermined communication channels between the bidirectional data bus and the time-multiplexed switch for use in conveying inter-module packet traffic.

In the exemplary embodiment, the packet switching units each have a number of packet switching nodes, referred to as such since they accumulate received data bits into packets and subsequently transmit the packets on toward their destinations. A predetermined one of the nodes is connectible to the time-multiplexed switch and certain ones of the nodes are connectible to the user terminals of the switching module. The packet switching unit further includes a packet interconnect to interconnect the nodes to provide packet-switched communication channels between the user terminals of the switching module and between the user terminals of the switching module and the predetermined node. The time-multiplexed switch interconnects the predetermined nodes of the switching modules to provide packet-switched communication channels between the user terminals of different switching modules.

In the exemplary embodiment, the packet switching nodes transmit request signals to the packet interconnect. The packet interconnect generates selection signals each defining one of the nodes and responds to a request signal from a given node and to a generated selection signal defining the given node, by transmitting a clear signal to the given node. The given node responds to the clear signal from the packet interconnect by transmitting a packet thereto. A sequencing arrangement sequentially enables each of the nodes to transmit information to the packet interconnect.

In accordance with the exemplary embodiment, the predetermined node of each of the switching modules is connected to the predetermined node of each of the other switching modules in a directly-connected, mesh topology. In a first alternative embodiment, the predetermined node of only one of the switching modules is connected to the predetermined nodes of other switching modules in a star topology.

A packet switching network is included in a second alternative embodiment of the invention. Each of the packet switching nodes connectible to user terminals is also connectible to the packet switching network. Further, a packet switching node is connected to a control unit used to control the operation of the time-slot interchange unit. The packet interconnect provides signaling channels between each of the user terminals and the control unit of the switching module. The nodes connectible to user terminals transmit signaling packets received from user terminals to the control unit of the switching module, and transmit data packets received from user terminals to the packet switching network.

BRIEF DESCRIPTION OF THE DRAWING

A more complete understanding of the present invention may be obtained by a consideration of the following description when read in conjunction with the drawing in which:

FIG. 14 is a time sequence diagram illustrating the flow of control messages between user terminals and the switching system of FIG. 1 through 3 to establish and subsequently disconnect a circuit-switched call;

FIG. 17 shows entries in the routing tables of two protocol handlers involved in an intra-module packet-switched call example;

FIG. 18 shows entries in the routing tables of four protocol handlers involved in an inter-module packet-switched call example.

FIG. 21 is a diagram showing only changes and additions to the system of FIG. 1 through 3 that are required in a second alternarive embodiment of the invention;

FIG. 27 is a functional diagram of the communication sequence required for call setup in the system of FIG. 22;

GENERAL DESCRIPTION

Figure 1:
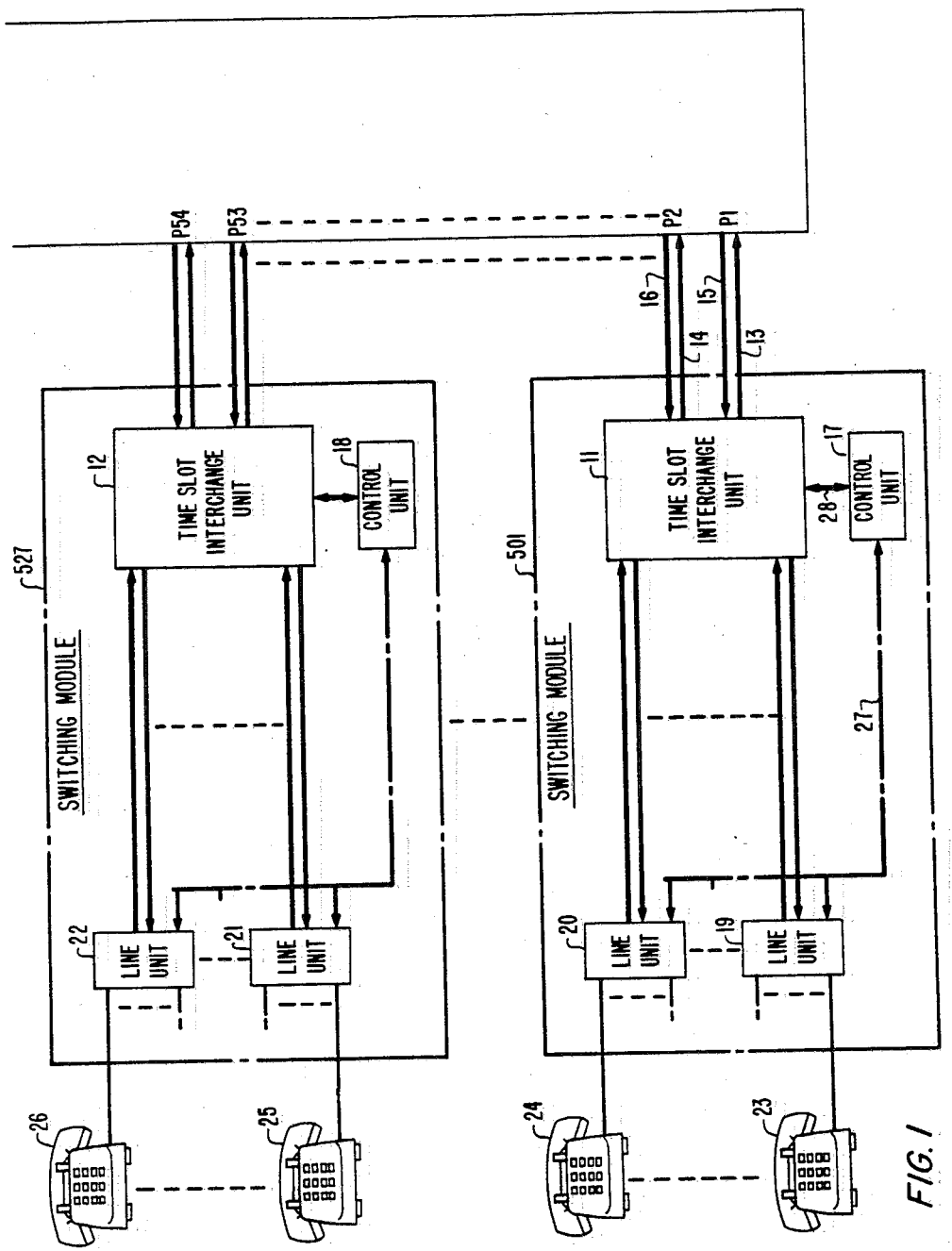
FIG. 1 through 3, when arranged in accordance with FIG. 12, is a block diagram of an exemplary embodiment of an integrated packet switching and circuit switching system that includes a distributed packet switching arrangement illustrating the principles of the present invention.
Figure 2:
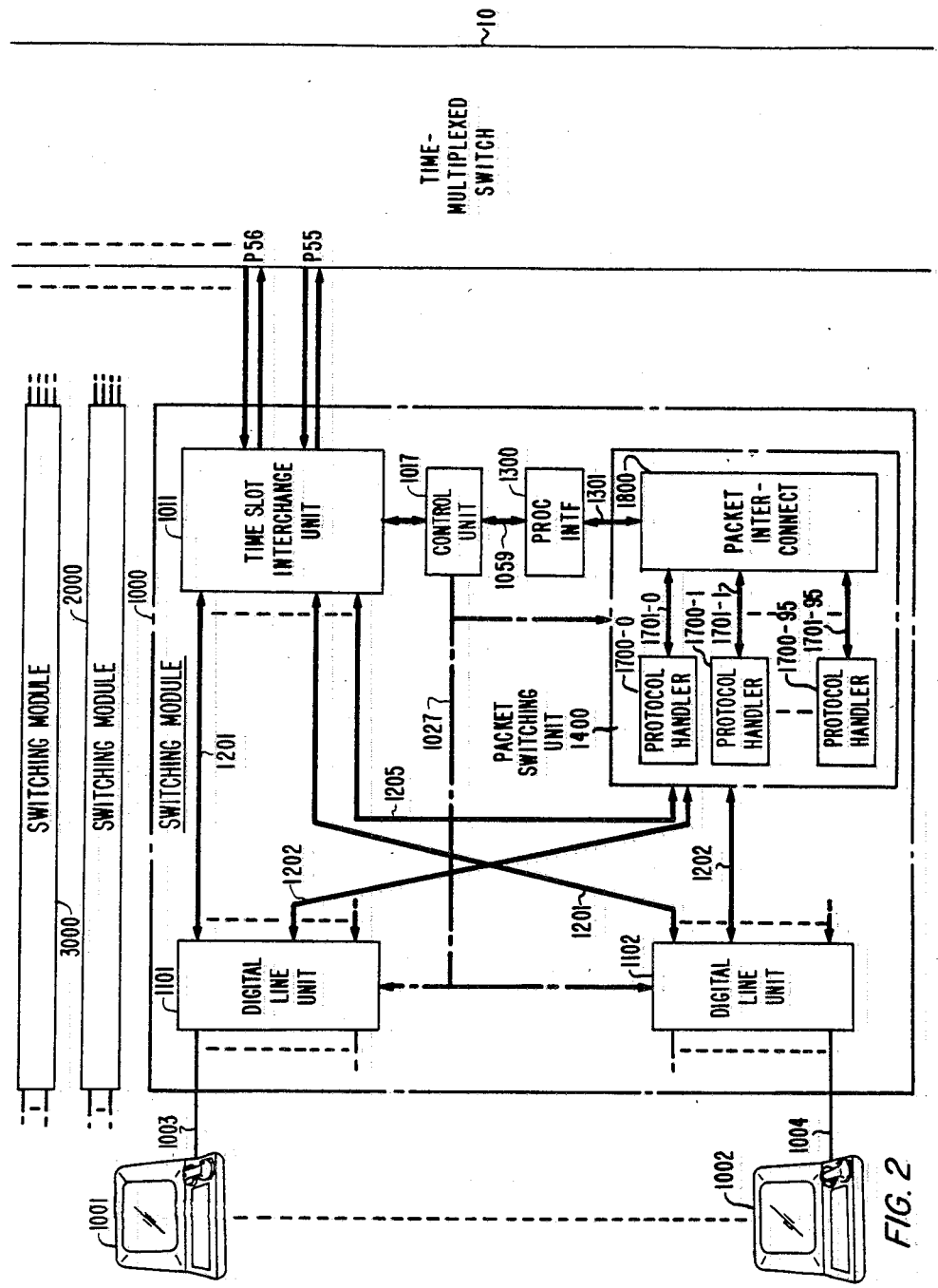
Figure 3:
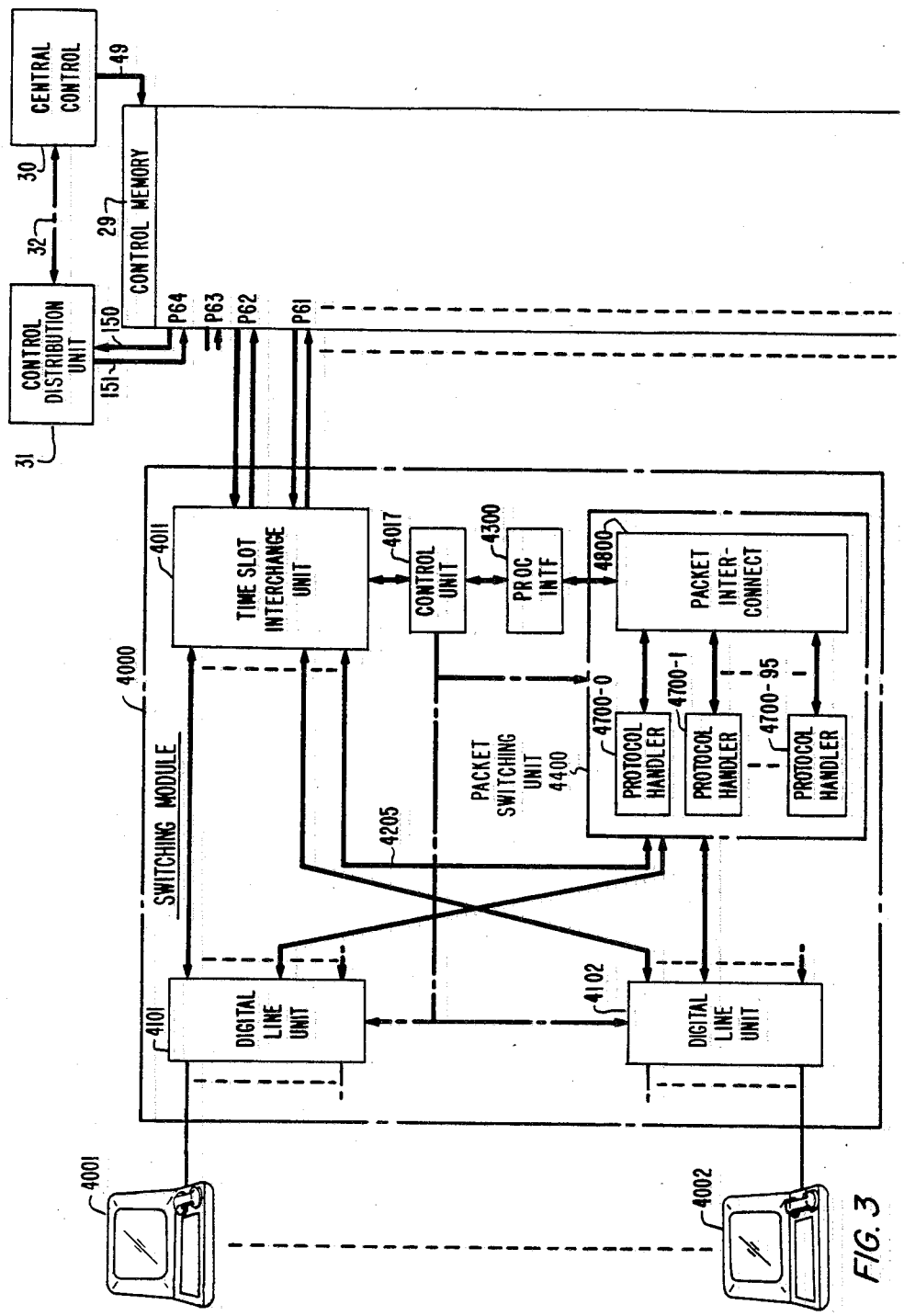

FIGS. 1 through 3, when arranged in accordance with FIG. 12, present a block diagram of an exemplary time division switching system illustrating the principles of the present invention. The system includes 27 switching modules, e.g., 501, 527, and a time-multiplexed switch 10 to provide circuit-switched communication channels among a plurality of conventional subscriber sets, e.g., 23 through 26. Each switching module includes a control unit which controls switching module operation including the establishment of circuit-switched channels by a time-slot interchange unit. For example, switching module 501 includes control unit 17 which controls the operation of time-slot interchange unit 11 and switching module 527 includes control unit 18 which controls the operation of time-slot interchange unit 12. The switching module control units, e.g., 17 and 18, and a central control 30 used to control the operation of time-multiplexed switch 10, communicate with each other via an interprocessor communication mechanism using predetermined control channels of time-multiplexed switch 10 and a control distribution unit 31 in a manner described in detail herein. When, for example, control unit 17 first detects an off-hook condition of subscriber set 23 and subsequently detects the dialing of a sequence of digits defining one of the other subscriber sets served by switching module 501, e.g., set 24, control unit 17 and central control 30 exchange control messages and control unit 17 thereafter effects the establishment of a bidirectional, circuit-switched communication channel between subscriber sets 23 and 24 by time-slot interchange unit 11 for the duration of a voice call between those sets 23 and 24. Further, when subscriber set 23 calls a subscriber set served by switching module 527, e.g., set 26, control units 17 and 18 and central control 30 exchange control messages to establish the call. Central control 30 writes instructions via a path 49 into a control memory 29 defining an available time-multiplexed switch 10 channel between time-slot interchange units 11 and 12. Control unit 17 effects the establishment by time-slot interchange unit 11 of a circuit-switched communication channel between subscriber set 23 and the available time-multiplexed switch 10 channel. Similarly, control unit 18 effects the establishment by time-slot interchange unit 12 of a circuit-switched communication channel between subscriber set 26 and the available time-multiplexed switch 10 channel. The switching system is of the time-space-time type with time-slot interchange unit 11 representing the first time stage, time-multiplexed switch 10 the space stage and time-slot interchange unit 12 the second time stage for the call from subscriber set 23 to subscriber set 26. The portion of the system described thus far is substantially as disclosed in U.S. Pat. No. 4,322,843 issued to H. J. Beuscher et al., on Mar. 30, 1982 and is described in detail later herein.

In accordance with the present exemplary embodiment of the invention, four switching modules 1000, 2000, 3000 and 4000 are included in the system to provide both circuit switching and packet switching service to a plurality of user terminals e.g., 1001, 1002, 4001 and 4002, representing, for example, customer teleterminals, vendor databases, telephone operator position terminals or packet access ports. Only switching modules 1000 and 4000 are shown in detail in FIG. 2 and 3. Each user terminal, e.g., 1001, transmits information to and receives information from its associated switching module, e.g., 1000, in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) Each B-channel is separately circuit-switched by the system to other user terminals, e.g., 1002, 4001, 4002, or subscriber sets, e.g., 23 through 26. The D-channel is used both to convey signaling packets to effect message signaling between user terminals and the system and to convey data packets among user terminals. The D-channel is packet-switched by the system either to other user terminals or to a control unit 1017 which controls the establishment of both circuit-switched calls and packet-switched calls within switching module 1000. The message signaling between user terminals and control unit 1017 can be of either the functional or stimulus types. Functional signaling involves a degree of intelligent processing in its generation or analysis whereas stimulus signaling is either generated as a result of a single event at a user terminal, e.g., a key depression, or contains a basic instruction from the switching system to be executed by a user terminal.

In the present exemplary embodiment, information is conveyed between a user terminal, e.g., 1001, and switching module 1000 via a four-wire, user access line 1003 using one pair of wires for each direction of transmission. User line 1003 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User line 1003 represents what is referred to by the International Telegraph and Telephone Consultative Committee (CCITT) as the T-interface. The use of the T-interface in the present system is only exemplary. The invention is equally applicable to systems using other access methods.

In switching module 1000, the user lines, e.g., 1003 and 1004, are terminated by two digital line units 1101 and 1102. Information is conveyed between each of the digital line units 1101 and 1102 and a time-slot interchange unit 1011 via a plurality of 32-channel bidirectional time-multiplexed data buses 1201. Further, information is conveyed between each of the digital line units 1101 and 1102 and a packet switching unit 1400 via a plurality of 32-channel bidirectional time-multiplexed data buses 1202. The data buses 1201 are used primarily to convey B-channel information which is circuit switched by time-slot interchange unit 1011 either to user terminals served by switching module 1000 or to time-multiplexed switch 10. However the data buses 1201 are also used to convey D-channel information which is further conveyed via certain time-slot interchange unit 1011 channels that are predetermined at system initialization and via a 32-channel bidirectional data bus 1205 to packet switching unit 1400. Each channel or time slot on the data buses 1201 can include eight B-channel bits from one user terminal or two D-channel bits from each of four different user terminals. The data buses 1202 are used to convey only D-channel information. Each channel or time slot on the data buses 1202 and 1205 can include two D-channel bits from each of four different user terminals.

Figure 7:
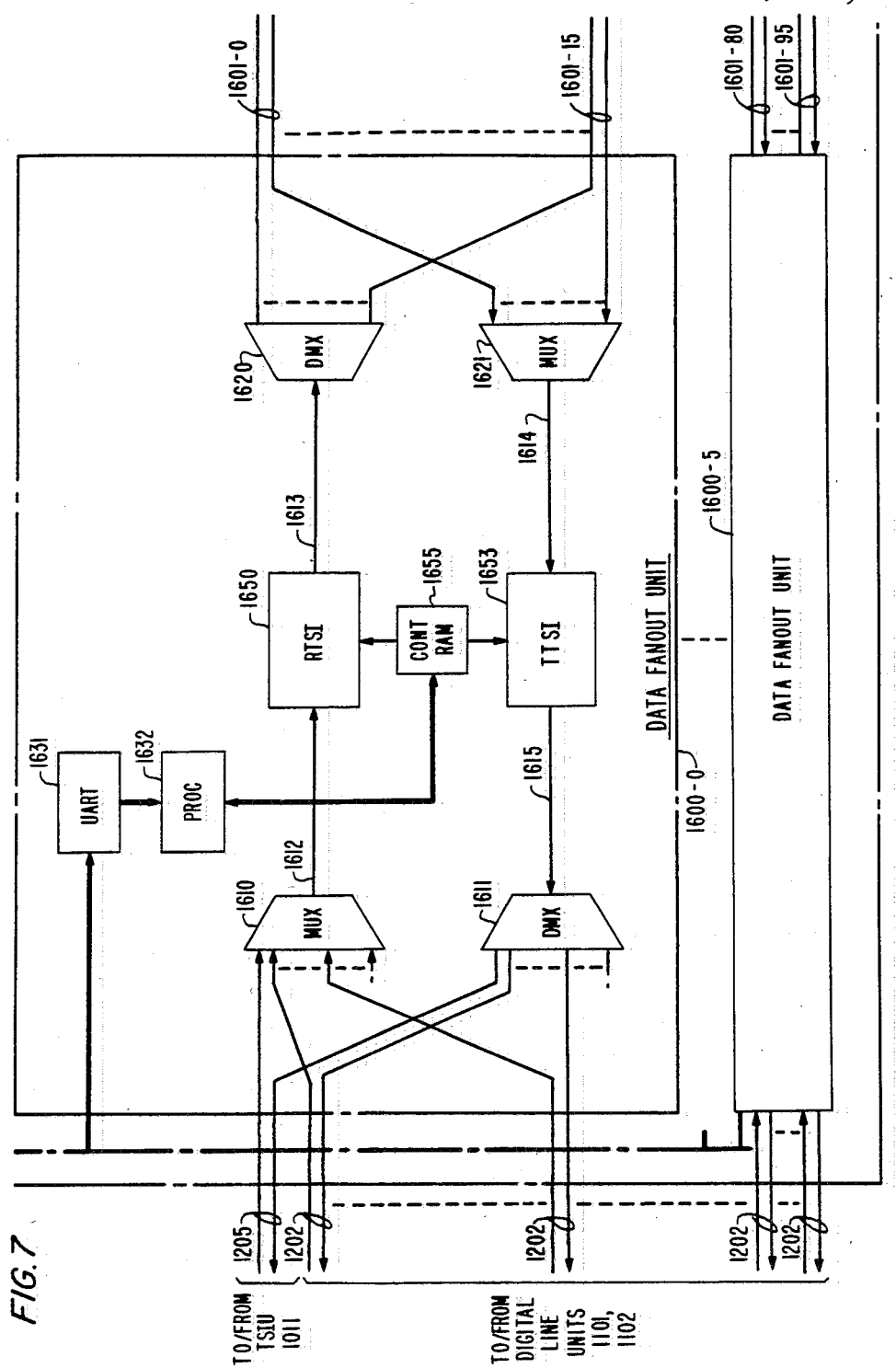
Figure 8:
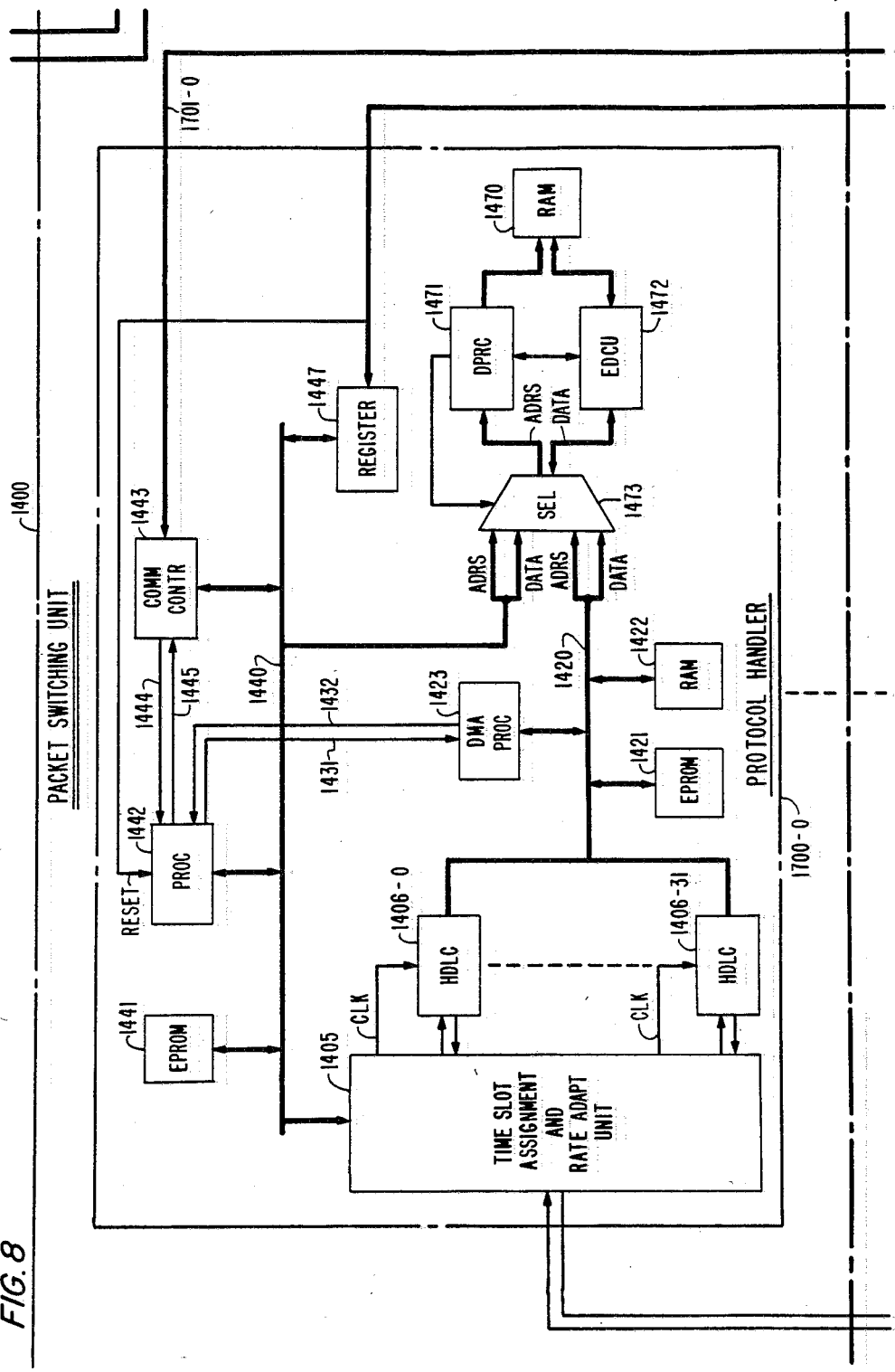

In the present exemplary embodiment, packet switching unit 1400 includes 96 protocol handlers 1700-0 through 1700-95, and packet interconnect 1800 which interconnects protocol handlers 1700-0 through 1700-95 and a processor interface 1300. Each user terminal, e.g., 1001, is associated with one of the protocol handlers 1700-0 through 1700-95 and, more particularly, with one of 32 High-level Data Link Control (HDLC) circuits, e.g., 1406-0 (FIG. 8), included in that associated protocol handler. In the present embodiment, communication links are established between the HDLC circuits of the protocol handlers and peer HDLC circuits (not shown) in the user terminals at system initialization. These links are used to convey packets within HDLC frames in accordance with the well-known HDLC protocol. The connections between a given protocol handler and its associated D-channels on data buses 1202 and 1205 are completed by one of six data fanout units, e.g., 1600-0 (FIG. 7).

The packets conveyed on the D-channel communication links between user terminals and associated protocol handlers are of variable length. Each user terminal, e.g., 1001, transmits and receives packets in one or more logical communication channels. In accordance with this example, logical channel LCN1 is used to convey signaling packets to set up both circuit-switched and packet-switched calls to and from user terminal 1001 and logical channel LCN2 is used to convey data packets during packet-switched calls to and from user terminal 1001. The logical channel number of each packet is defined by part of a header of that packet. Each packet received by a protocol handler from a user terminal is stored in a random access memory (RAM), e.g., RAM 1470 (FIG.8), in that protocol handler. If the received packet is a signaling packet, i.e., it was received in logical channel LCN1, it is transmitted via packet interconnect 1800 to processor interface 1300. If the received packet is a data packet, i.e., it was received in logical channel LCN2, and a packet-switched call has previously been established, it is transmitted via packet interconnect 1800 to the protocol handler associated with the destination user terminal for subsequent transmission thereto. (If the packet-switched call is established between two user terminals that are associated with the same protocol handler, the data packets need not be transmitted via packet interconnect 1800. Instead, the protocol handler simply tranmits the data packets in the appropriate channel to the destination user terminal.)

When a given protocol handler, e.g., 1700-0, has received a complete packet from a user terminal and has determined the destination of that packet, i.e., either one of the other protocol handlers or processor interface 1300, it transmits a logic zero Request To Send (RTS) signal, also referred to herein as a request signal, on one conductor of a six-conductor bus 1701-0 to packet interconnect 1800. Similarly, when processor interface 1300 has a packet ready for transmission to one of the protocol handlers, it transmits a logic zero RTS signal on one conductor of a six-conductor bus 1301. Packet interconnect 1800 enables each of the protocol handlers and the processor interface 1300 to transmit in a predetermined sequence. Since processor interface 1300 transmits signaling packets to all of the user terminals served by switching module 1000, the sequence effected by packet interconnect 1800 enables processor interface 1300 sixteen times for each enabling of an individual protocol handler. When the packet inrerconnect 1800 sequence reaches protocol handler 1700-0, packet interconnect 1800 responds to the RTS signal on bus 1701-0 by transmitting a logic zero Clear To Send (CTS) signal, also referred to herein as a clear signal, on a second conductor of bus 1701-0 to protocol handler 1700-0. Protocol handler 1700-0 responds to the CTS signal by transmitting its stored packet at a high rate. e.g., 10 megabits per second, via packet interconnect 1800 to its destination. All of the protocol handlers and the processor interface 1300 can receive the packet, but in the present embodiment, typically only one destination as defined by the packet header actually stores the packet for subsequent transmission. Only after the complete packet has been transmitted by protocol handler 1700-0, does the packet interconnect 1800 sequence resume. The receipt of the packet by the destination protocol handler or by processor interface 1300 is acknowledged by the transmission of an acknowledgment packet back to protocol handler 1700-0.

The other three switching modules equipped for packet switching are substantially identical to switching module 1000. In switching module 4000, the elements are numbered exactly 3000 greater than their counterpart elements in switching module 1000. The protocol handlers 1700-0 through 1700-95 and the processor interface 1300 in switching module 1000 and their counterpart elements in switching module 4000 are referred to herein as packet switching nodes since they accumulate received data bits into packets and subsequently transmit the packets on toward their destinations. In the present example, protocol handlers 1700-0 and 1700-2 through 1700-95 are connected to the D-channels from user terminals and are referred to as user packet switching nodes. Since processor interface 1300 is connected to convey control information to and from control unit 1017, processor interface 1300 is referred to as a control packet switching node. One protocol handler in each switching module, e.g., protocol handler 1700-1 in switching module 1000 and protocol handler 4700-1 in switching module 4000, is used for switching data packets for inter-module packet calls and is referred to as an intermediate packet switching node.

In the present embodiment, four channels on data bus 1205 are connected at system initialization by timeslot interchange unit 1011 to four channels, e.g., channels 109 through 112, at input/output port pair P55 of time-multiplexed switch 10. Similarly, four channels on data bus 4205 (FIG. 3) are connected by time-slot interchange unit 4011 to channels 109 through 112 at input/output port pair P61. Control memory 29 defines that a bidirectional communication path is to be established between input/output port pairs P55 and P61 during channels 109 through 112 of each time-multiplexed switch 10 cycle. By the use of these predefined connections, protocol handlers 1700-1 and 4700-1 can transmit packets either one packet at a time at a rate of 256 kilobits per second using all four channels, or up to four packets at a time each at a rate of 64 kilobits per second and each using one of the four channels, or various other combinations. (When multiple channels are used to transmit packets at rates of n×64 kilobits per second, the connections must be made through time-slot interchange units 1011 and 4011 in such manner that the bits of the n×64 kilobits per second bit stream, are received by protocol handler 4700-1 in the same order that they were transmitted by protocol handler 1700-1.) Assume that user terminal 1001 is associated with protocol handler 1700-0 and user terminal 4001 is associated with protocol handler 4700-0. Once a packet-switched call has been established between user terminals 1001 and 4001, a data packet is first transmitted from user terminal 1001 to protocol handler 1700-0 at a rate of 16 kilobits per second and stored. When enabled by packet interconnect 1800, protocol handler 1700-0 then transmits the data packet at a 10 megabits per second rate to protocol handler 1700-1. Protocol handler 1700-1 transmits the data packet via the predetermined channels of bus 1205, time-slot interchange unit 1011, time-multiplexed switch 10, time-slot interchange 4011 and bus 4205 to protocol handler 4700-1 at, for example, a 256 kilobits per second rate. When enabled by packet interconnect 4800, protocol handler 4700-1 then transmits the data packet at the 10 megabits per second rate to protocol handler 4700-0. Finally protocol handler 4700-0 transmits the data packet at the rate of 16 kilobits per second to user terminal 4001. Of course, appropriate entries must be made in routing tables in each of the protocol handlers 1700-0, 1700-1, 4700-1 and 4700-0 as part of the process of establishing such a packet-switched call. That process including the necessary exchange of control communications among the control units 1017 and 4017 and central control 30 is described in detail herein.

DETAILED DESCRIPTION

Figure 22:
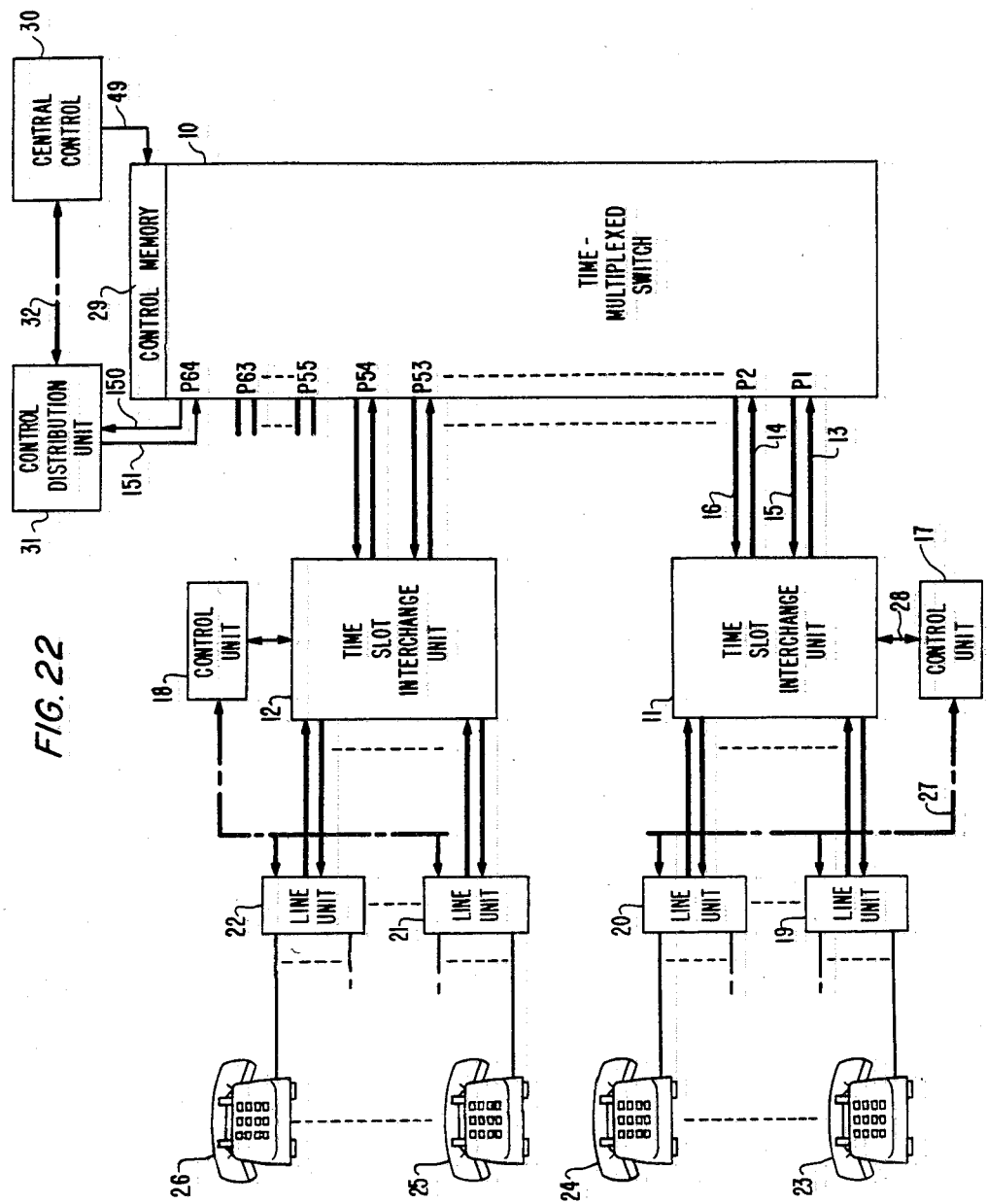
FIG. 22 is a block diagram of a time division, circuit switching system before four additional switching modules are integrated as shown in FIG. 1 through 3 to provide packet switching capability.

FIG. 22 is a block diagram of a time division, circuit switching system substantially as disclosed in the above-cited Beuscher U.S. Pat. No. 4,322,843. The exemplary integrated packet switching and circuit switching system of FIG. 1 through 3 comprises the system of FIG. 22 to which four additional switching modules, 1000, 2000, 3000 and 4000, are added. The description which follows is arranged in two parts. First the FIG. 22 system is described. With that description as a foundation, the exemplary embodiment of the invention shown in FIG. 1 through 3 is then described.

FIG. 22 System

The time division switching system of FIG. 22 is used to interconnect subscriber sets such as subscriber sets 23 through 26 and includes a time-multiplexed switch 10 comprising a time-shared space division switch having 64 input ports and 64 output ports. Also included are 27 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time-multiplexed switch 10. In the system of FIG. 22, time-slot interchange unit 11 is connected to two time-multiplexed switch input ports via time-multiplexed lines 13 and 14 and to two output ports, via time-multiplexed lines 15 and 16.

In the description which follows, the input and output ports of time-multiplexed switch 10 are referred to as input/output port pairs. This term is used since the source for data words to an input port of a given input/output port pair is also the destination for data words from the output port of that pair. As shown in FIG. 22, input/output port pair P1 is associated with time-multiplexed lines 13 and 15. Each time-multiplexed line 13 through 16 conveys digital information in 125-microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 22 via individual time-multiplexed lines. Line units 19 and 20 are connected to time-slot interchange unit 11 and line units 21 and 22 are connected to time-slot interchange unit 12. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchang unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. Line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time-multiplexed line between a time-slot interchange unit and the time-multiplexed switch 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and the time-multiplexed switch 10 under the control of control units 17 and 18.

Time-multiplexed switch 10 operates in recurring frames of time slots where each 125-microsecond frame comprises 256 time slots. During each time slot, time-multiplexed switch 10 is capable of connecting data words received at any of its 64 input ports to any of its 64 output ports in accordance with time-slot control information stored in a control memory 29. The configuration pattern of connections through time-multiplexed switch 10 repeats itself every 256 time slots and each time slot is assigned a numerical designation in sequence from 1 to 256. Accordingly, during a first time slot TS 1 the information in a channel (1) on time-multiplexed line 13 may be switched by time-multiplexed switch 10 to an output port P64 while during the next time slot TS 2 the next channel (2) on time-multiplexed line 13 may be switched to an output port P53. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output port pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time slot having the same numerical designation as a control channel, time-multiplexed switch 10 connects the data word occupying that control channel to output port P64 and connects input port P64 to the output port associated with the above-mentioned control channel. The following is an example of the operation of the system of FIG. 22 when channel 1 is the control channel for time-multiplexed lines 13 and 15, and channel 2 is the control channel for time-multiplexed lines 14 and 16. During time slot TS 1 information from control memory 29 defines, among other connections, that the control word in channel 1 of time-multiplexed multiplexed line 13 is connected to output port P64 and that the control word in channel 1 at input port P64 is connected to time-multiplexed line 15. Similarly, during time slot TS 2, information from control memory 29 defines that the control word in channel 2 of time-multiplexed line 14 is connected to output port P64 and that the control word in channel 2 at input port P64 is connected to time-multiplexed line 16. When operating in this manner, output port P64 receives from time-multi-plexed switch 10 all control words in a channel having the same numerical designation in which they were transmitted to the time-multiplexed switch. Further, each control channel is connected to receive control words from input port P64 during the time slot having the same numerical designation as their associated control channel. Control words switched to output port P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port P64 of time-multiplexed switch 10 in a channel having the same numerical designation as the control channel associated with the destination unit.

When operating as above described, time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input port P64 during the channel having the same numerical designation as the control channel associated with time-slot interchange unit 12. A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. The operation of a particular embodiment of control distribution unit 31 is described in detail in the above-cited Beuscher U.S. Pat. No. 4,322,843.

Figure 23:
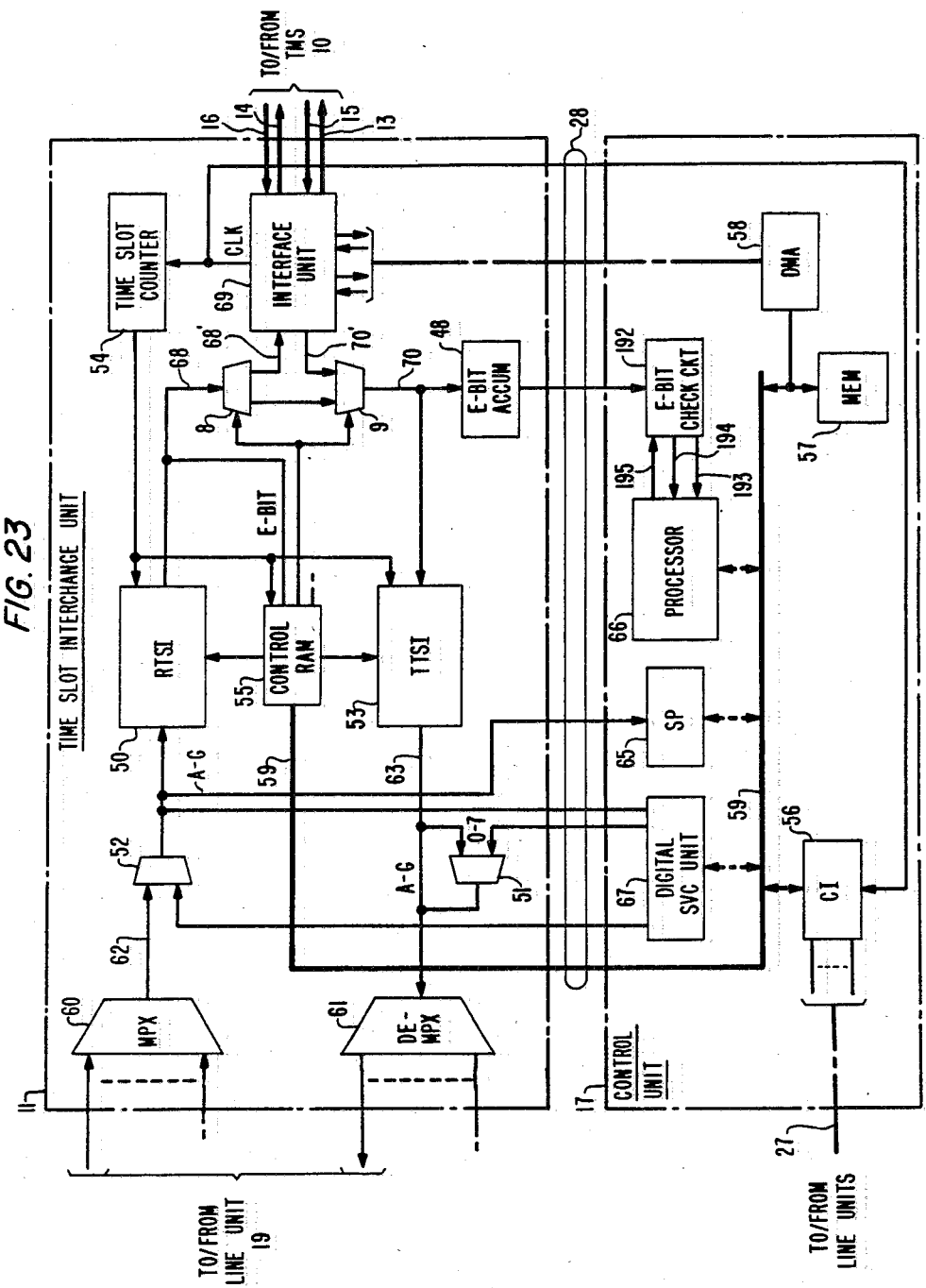
FIG. 23 is a more detailed diagram of a time-slot interchange unit and associated control unit utilized in the system of FIG. 22.

Each of the control units, e.g., 17 and 18, includes a memory 57 (FIG. 23) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57, e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through control distribution unit 31 is utilized to send this call related information to other control units and central control 30.

Figure 24:
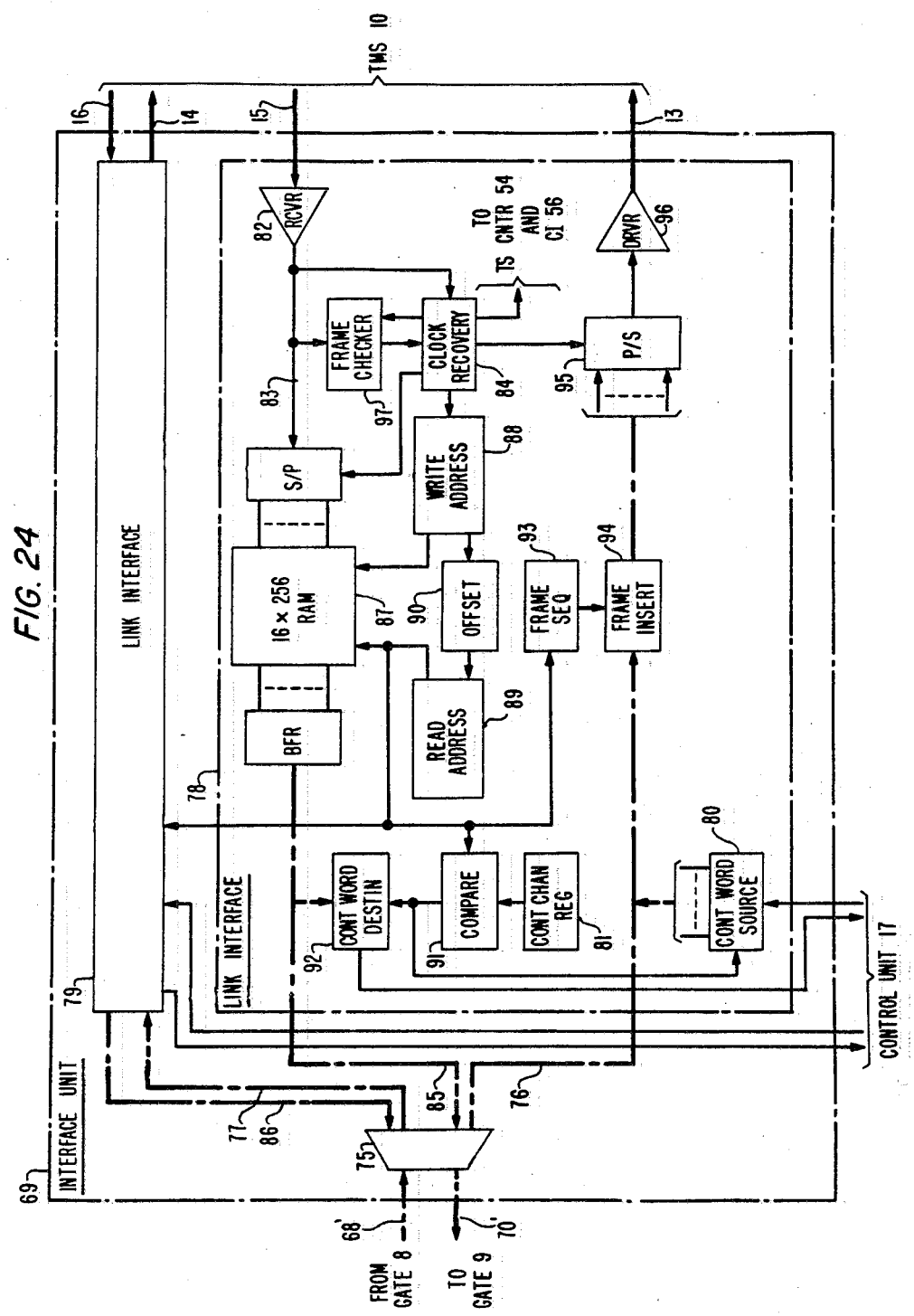
FIG. 24 is a diagram of an interface unit included within each time-slot interchange unit which is utilized for communication with a time-multiplexed switch of the system of FIG. 22.
Figure 26:
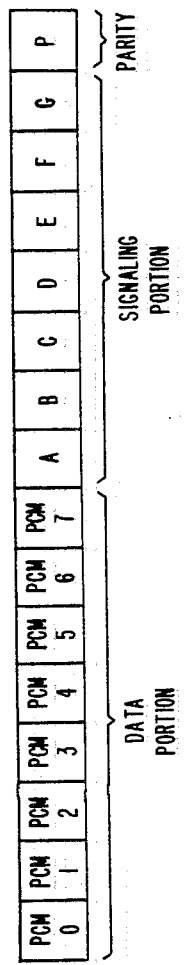
FIG. 26 is a diagram of a data word format utilized in the system of FIG. 22.

As previously stated, control unit 17 controls many of the operations performed by each of the line units. The main processing entity of control unit 17 is a processor 66 (FIG. 23) which operates in response to instructions stored in memory 57. Control unit 17 includes a control interface circuit 56 which receives instructions from processor 66 via a bus 59 and in response thereto, communicates with the line units, e.g., 19 and 20, via communication path 27. Control unit 17 also includes a signal processor 65 and a digital service unit 67. Signal processor 65 reduces the real time load requirement of processor 66 by receiving and analyzing the signaling portion (bits A through G, FIG. 26) of each data word received by time-slot interchange unit 11. Digital service unit 67 receives the data portion (FIG. 26) of each data word received by time-slot interchange unit 11 to detect tone signals from subscribers which have been converted into PCM signals. Digital service unit 67 is also used to transmit tones and signals in PCM format via a gate 51 to subscribers and via a gate 52 to time-multiplexed switch 10. The operation of control interface circuit 56, signal processor 65 and digital service unit 67 as well as line unit 19 is described in detail in the above-cited Beuscher U.S. Pat. No. 4,322,843. In the system of FIG. 22, the clock signals used within the line units are transmitted by a clock recovery circuit 84 (FIG. 24) within an interface unit 69 (FIG. 23) via control interface 56 and communication path 27.

Each of the line units transmits recurring frames each comprising 64 digital channels of 16 bits each. This information is transmitted to a multiplex unit 60 (FIG. 23) within time-slot interchange unit 11. Multiplex circuit 60 receives the output signals from eight line units which signals are reformatted and transmitted on an output time-multiplexed line 62 having 512 channels for each 125 microsecond frame. Similarly, a demultiplex circuit 61 receives 512 channels of 16 bits each on a time-multiplexed line 63 which channels are distributed in a predetermined arrangement to eight line units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to time-multiplexed switch 10 via a time-multiplexed line 68, a gate 8, a time-multiplexed line 68' and an interface unit 69. Data words from time-multiplexed switch 10 are received by time-slot interchange unit 11 by interface unit 69, and are conveyed via a time-multiplexed line 70', a gate 9 and a time-multiplexed line 70 to transmit time-slot interchanger 53. For calls among the subscribers served by the line units connected to time-slot interchange unit 11, control RAM 55 effects the operation of gates 8 and 9 such that data words transmitted by receive time-slot interchanger 50 on time-multiplexed line 68 are conveyed via gates 8 and 9 and time-multiplexed line 70 to transmit time-slot interchanger 53. Transmit time-slot interchanger 53 stores the incoming data words in a location defined by an address from control RAM 55. Data words are read from transmit time-slot interchanger 53 at the address defined by the time-slot counter 54. Data words so read are transmitted on time-multiplexed line 63 for transmission to the line unit 19. It should be noted that control RAM 55 may be implemented as a number of control memories each associated with a particular circuit, e.g., transmit time-slot interchanger 53. The particular configuration of control memories is not important to the present description and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and are not described in greater detail herein. One arrangement for reading and writing data words in time-slot memories is described in detail in U.S. Pat. No. 4,035,584, J. W. Lurtz.

Figure 28:
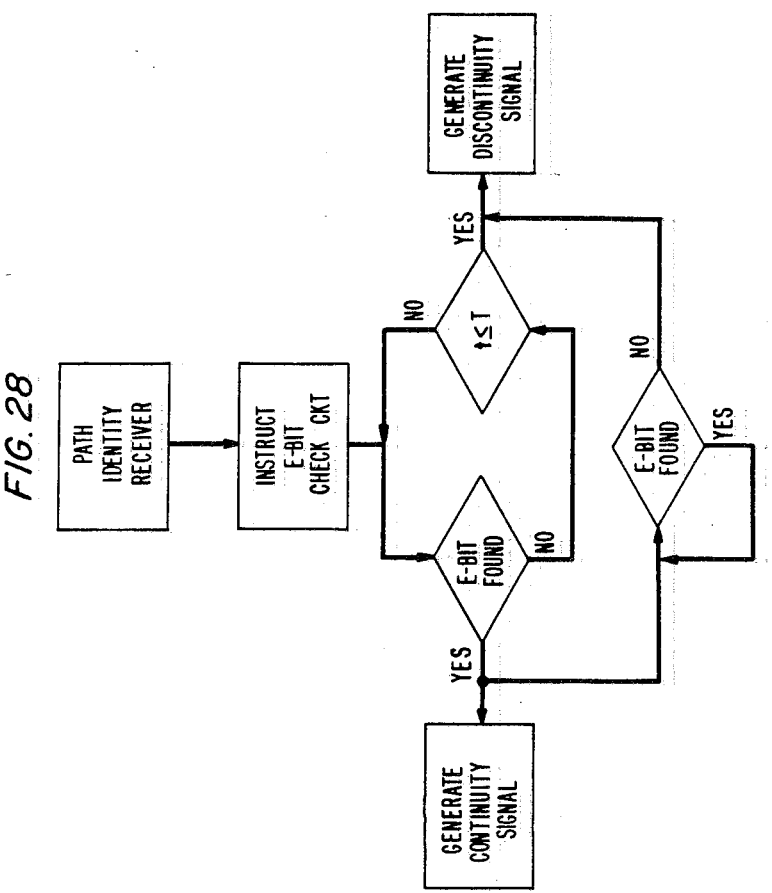
FIG. 28 is a diagram of the E-bit control sequence of the system of FIG. 22.

The primary mode of control information exchange in the system of FIG. 22 comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchange unit via the time-multiplexed switch 10 utilizing the time slot assigned for that call. The E-bit position of the data word in the call time slot is used for the secondary mode communication. However, it can be seen that any or all of the signaling bits could be used in this secondary communication mode. The E-bit serves the dual purposes of communication path continuity check and signal acknowledgment. Control RAM 55 (FIG. 23) includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchanger 50, it transmits the stored E-bit on time-multiplexed line 68 in place of the E-bit stored in receive time-slot interchanger 50. This allows the transmission of messages utilizing the E-bit channel between time-slot interchange units. The arrangement in FIG. 23 also includes an E-bit accumulator 48 which receives the E-bit of each data word received on time-multiplexed line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 28 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1"0 is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

Figure 29:
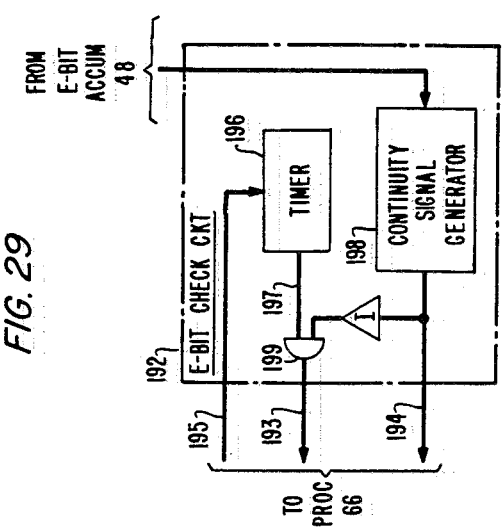
FIG. 29 is a diagram of an E-bit check circuit used in the system of FIG. 22.

FIG. 29 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66 timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary. The use of the E-bit channel in implementing call completion is discussed in greater detail later herein.

The following is a description of the primary mode of communication between the various control entities of the switching system. Processor 66, in response to a complete dialed number, performs translations with regard to that dialed number and formulates a control message for central control 30 (FIG. 22) so that an idle time slot for the call can be established through time-multiplexed switch 10. This control message is stored in memory 57 by processor 66. A DMA unit 58 of a type well known in the art reads the control message at the rate of one control word per frame and transmits that word to a control word source register 80 (FIG. 24) in interface unit 69 for transmission on the time-multiplexed line to time-multiplexed switch 10. Similarly, control messages are received from other control units and central control 30 at a control word destination register 92 (FIG. 24) in interface unit 69 and transmitted by DMA unit 58 to the memory 57 where they are read by processor 66. Interface unit 69, which is shown in detail in FIG. 24, includes a multiplex/demultiplex circuit 75 and two link interfaces 78 and 79. Multiplex/demultiplex circuit 75 is connected to receive data words from the receive time-slot interchange unit 50 via time-multiplexed line 68' and to transmit data words to transmit time-slot interchanger 53 via time-multiplexed line 70'. It will be remembered that both time-multiplexed lines 68' and 70' convey data words at the rate of 512 channels per 125-microsecond frame. Multiplex/demultiplex circuit 75 splits the information received on time-multiplexed line 68' into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70'. This combination occurs by alternatingly transmitting the data words from time-multiplexed lines 85 and 86 such that the data words from time-multiplexed line 85 are transmitted in the odd-numbered channels of time-multiplexed line 70' while data words from time-multiplexed line 86 are transmitted in even-numbered channels. Time-multiplexed lines 76 and 85 are connected to link interface 78 and time-multiplexed lines 77 and 86 are connected to link interface 79. It should be noted that the time-slot interchange unit 11 operates on the basis of 512 time slots (channels) per frame while the link interfaces 78 and 79 and the time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68' are delayed by multiplex/demultiplex circuit 75 so that the odd-numbered channel and the immediately following even-numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70' immediately after the data word received by multiplex/demultiplex circuit 75 substantially simultaneously therewith. In the course of the following description, the time slot of a given data word refers to its time slot with respect to link interfaces 78 and 79 and the time-multiplexed switch 10. For example, data words from channels 1 and 2 of time-multiplexed line 68' are both associated with time slot 1 of the link interfaces 78 and 79 and the time-multiplexed switch 10. Each of the link interface units 78 and 79 is uniquely associated with one input/output port pair of time-multiplexed switch 10.

Link interface 78 (FIG. 24) includes the receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83 are buffered in a random access memory circuit 87. The data words on conductor 83 are written into random access memory 87, at a location defined by a write address generator 88. Write address generator 88 receives a 2.048-megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts predetermined number therefrom. The result of this subtraction is then transmitted to read address generator 89. In this manner, read address generator 89 generates a sequence of read addresses which is approximately one-fourth of a frame (64 time slots) behind the addresses generated by the write address generator 88.

Link interfaces 78 and 79 of interface unit 69 operate in a master/slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control messages. The particular channel used by a given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control word source register 80 and to a control word destination register 92. Control word destination register 92, in response to the gating signal from comparator 91, stores the information on time-multiplexed line 85. During that particular channel, the information on time-multiplexed line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 includes a framing bit which is generated and transmitted by the time-multiplexed switch 10. A frame checker 97 reads each framing bit of each data word from time-multiplexed switch 10 and determines if the communication between time-multiplexed switch 10 and itself is still in synchronism. If synchronism exists, no corrections are made; however, if synchronism is found not to exist, reframing is accomplished by communication with the clock recovery circuit 84 in a manner well known in the art.

Figure 25:
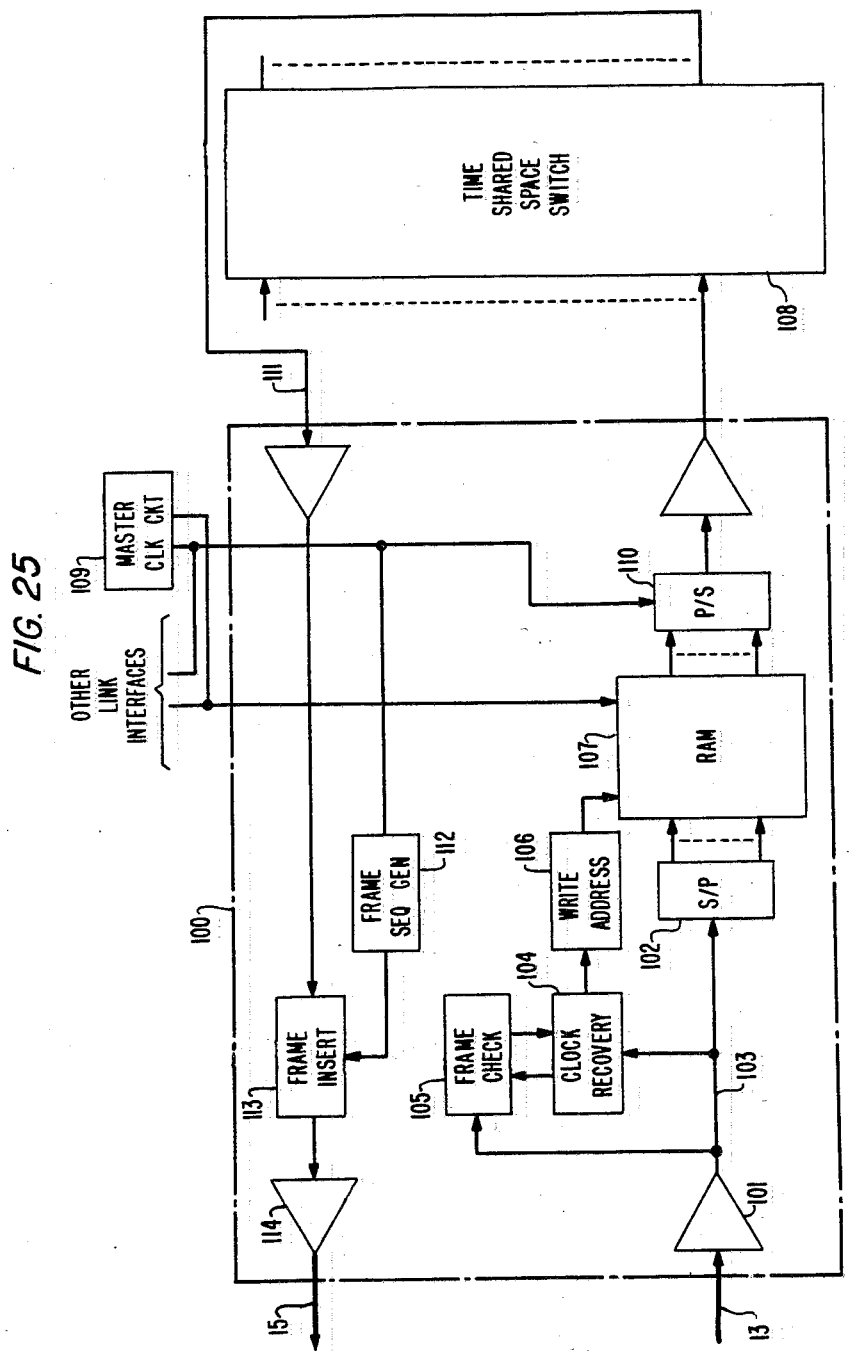
FIG. 25 is a diagram of an interface unit of a time-multiplexed switch which is utilized for communication with a time-slot interchange unit of the system of FIG. 22.

The input and output ports of time-multiplexed switch 10 can be considered in pairs for both ports are connected to the same link interface. Further, each pair of input and output ports of the time-multiplexed switch 10 is connected to a time-multiplexed switch link interface of a type similar to link interfaces 78 and 79. Link interface 78 is connected to a time-multiplexed switch link interface 100 (FIG. 25) including a receiver 101 which receives data words from time-multiplexed line 13 and transmits those data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes a time-shared space division switch 108 which operates in frames of 256 time slots of approximately 488 nanoseconds each to complete paths among its input and output ports. Control information defining the switching path between the input and output ports to be connected during each time slot is stored in a control memory 29 (FIG. 22) which is read each time slot to establish those connections. It will be remembered that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time-multiplexed switch 10 includes a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. The data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 111 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time-multiplexed line 15.

The following is an example of call setup and removal in the system of FIG. 22. In the example, a subscriber at subscriber set 23 wishes to call subscriber 26. Line unit 19 detects the originating off-hook at subscriber set 23 and transmits a message to control unit 17 via communication path 27. Control unit 17, in response to this message from line unit 19 transmits an instruction to line unit 19 defining which communication channel between line unit 19 and time-slot interchange unit 11 is to be used for data word communication. Further, control unit 17 begins to transmit dial tone in the channel associated with the newly off-hook subscriber between time-slot interchange unit 11 and line unit 19. Control unit 17 continues to survey the DC state of subscriber set 23. Control unit 17 further detects the dialing of digits at subscriber set 23 and terminates dial tone in response to the first such digit. Based on the entire dialed number and the calling party's identity, control unit 17 formulates a control message for central control 30. This control message comprises a destination portion identifying central control 30 and further includes the calling party identity, the called party identity, and certain calling party related information, e.g., class of service.

FIG. 27 is a functional diagram of the communication among the processors for the establishment of a call between subscribers. In FIG. 27 originating unit 190 represents originating subscriber set 23, line unit 19, time-slot interchange unit 11, and control unit 17. Similarly, terminating unit 191 represents terminating subscriber 26, line unit 22, time-slot interchange unit 12, and control unit 18. Each communication in the call completion sequence is represented in FIG. 27 by a line, terminating with an arrowhead to indicate its direction, having an associated letter (a) through (g). In the course of the following discussion, the letters (a) through (g) are used to identify the particular communication being discussed. The control message (a) formulated by control unit 17 of the originating unit 190 is transmitted, as previously described, one control word per frame in the control channel of time-multiplexed line 13. The time-multiplexed line associated with an odd-numbered input/output port is the primary time-multiplexed line used to convey control messages. The time-multiplexed line associated with an even-numbered input/output port pair is utilized to convey longer messages such as program and/or data update messages. Accordingly, the control channel of time-multiplexed line 13 is used to convey the control messages in the present example. The control words in this control channel are switched by time-multiplexed switch 10 to the control distribution unit 31 during the time slot associated with that control channel. As previously described, control distribution unit 31 interprets the destination portion of the message received and transmits the message to central control 30.

Central control 30 computes the identity of the time-slot interchange unit associated with the called party identity and assigns an idle time slot for communication between called and calling parties. In the present example, it is assumed that time slot TS 16 is selected for this communication. Central control 30 then transmits a control message (b) to time-slot interchange unit 12 of terminating unit 191 which is connected to subscriber set 26 via the control distribution unit 31 and time-multiplexed switch 10. This control message (b) comprises the called subscriber identity, the identity of time-slot interchange unit 11 which is connected to the calling party and the time slot to be used for communication through time-multiplexed switch 10. At substantially the same time that central control 30 transmits the control message (b) to time-slot interchange unit 12, it transmits instructions (c) to control memory 29 via communication path 49 which instructions define the switching paths to be used during time slot TS 16 to connect time-slot interchange unit 11 and time-slot interchange unit 12. Control unit 18 of terminating unit 191 in response to the control message (b) from central control 30 assigns a channel between line unit 22 and time-slot interchange unit 12 for the communication with subscriber set 26 and begins transmission of the logical "1" E-bit (d) in the channel associated with subscriber set 26 to the time-multiplexed switch 10 Recall that a control unit controls the transmission of logical "1" E-bits in a given channel by accessing the storage location of RAM 55 associated with that channel and setting its E-bit position to a logical "1". Further, control unit 18 formulates a control message defining the identities of time-slot interchange unit 12 of the terminating unit 191, the time slot (TS 16) which is to be used for the communication, and any information about subscriber set 26 which is necessary for control unit 17 to complete the call. This control message (e) is transmitted to time-slot interchange unit 11 of originating unit 190 via the control channel to time-multiplexed switch 10, the control distribution unit 31 and back through time-multiplexed switch 10 in the control channel associated with time-slot interchange unit 11. In addition to the above, processor 66 of control unit 18 instructs E-bit check circuit 192 to survey the state of the E-bit in time slot TS 16 for a predetermined period of time, e.g., 128 frames.

Control unit 17, in response to the message from control unit 18 begins to transmit in the channel associated with subscriber set 23 a logical "1" E-bit (f) to time-multiplexed switch 10. Further, control unit 17 of the originating unit 190 checks the E-bit of the incoming channel 16 from time-slot interchange unit 12 for the presence of a logical "1". When such a logical "1" E-bit is received, a continuity signal is transmitted from E-bit check circuit 192 to processor 66 of control unit 17 indicating that communication path continuity from time-slot interchange unit 12 to time-slot interchange unit 11 is known. When communication path continuity exists from time-slot interchange unit 11 to time-slot interchange unit 12, E-bit check circuit 192 of control unit 18 will detect a logical "1" E-bit in channel 16 during the predetermined period of time. E-bit check circuit 192 of control unit 18 transmits a continuity signal to its associated processor 66 in response to the logical "1" E-bit. In response to the continuity signal from E-bit check circuit 192 of control unit 18, line unit 22 is notified to transmit ring current to subscriber set 26 and audible ring tones are returned during time slot TS 16 to subscriber set 23. When subscriber set 26 is taken off-hook, line unit 22 notifies control unit 18 which terminates the transmission of audible ring tones to subscriber set 23 and terminates the application of ring current to subscriber set 26. Control unit 18 then transmits a control message (g) over the control channel from time-slot interchange unit 12 to time-slot interchange unit 11 indicating that an answer has occurred. The parties can now communicate.

Call termination normally is controlled by the control unit associated with the calling party, which, in the present example, is control unit 17. When subscriber set 23 goes on-hook, the E-bit in the channel between subscriber sets 23 and 26 is changed to a logical "0". Control unit 18 in response to the logical "0" E-bit transmits a control message to central control 30 defining that its part of the call is completed. Further, a similar message is transmitted from control unit 17 when the on-hook is detected. In response to these two messages, central control 30 controls the control memory 29 to drop the path connecting the channels between subscriber sets 23 and 26. Further, the control units 17 and 18 make the path from their associated subscriber sets to the time-multiplexed switch 10 idle so that these paths can be used for further communications. When subscriber set 26 is the first to go on-hook, control unit 18 transmits the control message to control unit 17 via the control channel informing control unit 17 that the on-hook has occurred. Control unit 17, in response to such a message, waits for a predetermined period of time, similar to hit timing, then initiates the call termination procedure as described immediately above.

The terminating party can have certain characteristics which change the normal call completion/termination routine. For example, subscriber 26 (the terminating subscriber of the previous example) might be subject to call tracing. In this situation it is desirable that any call to subscriber 26 be held in the completed state until subscriber 26 goes on-hook. In accordance with this example, a call is established in much the same manner as described in the previous example. The first control message from time-slot interchange unit 12 to time-slot interchange unit 11, however, will include a portion indicating that call tracing is operative on the soon-to-be-completed call. Control unit 17 in response to this control message, modifies the call termination sequence so that the completed paths are not removed until a message is received from control unit 18 indicating that subscriber 26 has gone on-hook.

Exemplary Embodiment of the Invention

An exemplary embodiment of the present invention, shown in FIGS. 1 through 3 arranged in accordance with FIG. 12, comprises the time division, circuit switching system of FIG. 22 into which four additional switching modules 1000, 2000, 3000, and 4000 are integrated. The additional switching modules are connected using input/output port pairs P55 through P62 of time-multiplexed switch 10. Only switching modules 1000 and 4000 are shown in detail in FIG. 2 and 3. A given switching module, e.g., 1000, provides both packet-switched communication channels and circuit-switched communication channels among the plurality of user terminals, e.g., 1001, 1002, connected thereto without transmitting such channels through time-multiplexed switch 10. Time-multiplexed switch 10 is only used for intermodule calls.

Switching Module 1000

Switching module 1000 (FIG. 2) includes two digital line units 1101 and 1102, a time-slot interchange unit 1011, a control unit 1017, a processor interface 1300 and a packet switching unit 1400. Time-slot interchange unit 1011 and control unit 1017 are substantially identical to time-slot interchange unit 11 and control unit 17 (FIG. 23) already described. Since in the present embodiment, the signaling between user terminals and control unit 1017 is done using message signaling via user D-channels, packet switching unit 1400 and processor interface 1300, the processor functions required in control unit 17 to detect on-hook and off-hook conditions, dialed digits, etc. are not required in control unit 1017. In control unit 17, the control interface 56 (FIG. 23) is used to convey control information to line units via path 27. In control unit 1017, the equivalent of control interface 56 is used to convey control information via a communication path 1027 to digital line units 1101 and 1102 and to packet switching unit 1400. Bus 1059, which is the equivalent of bus 59 in control unit 17 used for communication with processor 66, is also connected to processor interface 1300 and is the means by which signaling information is conveyed between user terminals and control unit 1017.

Digital Line Unit 1101

Figure 4:
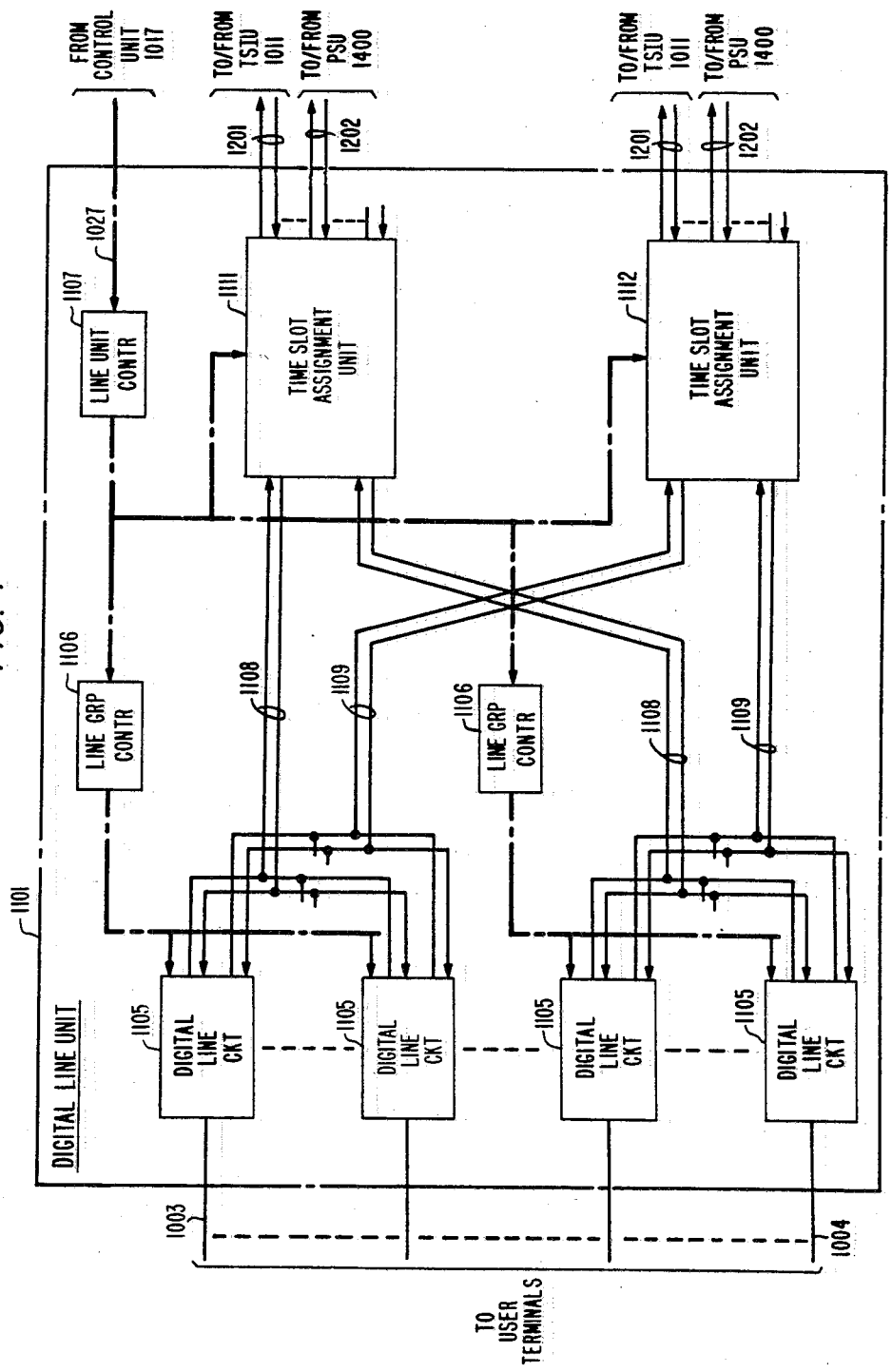
FIG. 4 is a more detailed diagram of a digital line unit included in the system of FIG. 1 through 3.

Digital line unit 1101 is shown in greater detail in FIG. 4. Each user access line, e.g., 1003, terminates on a separate one of a plurality of digital line circuits 1105. Recall that in the present embodiment user access line 1003 is a four-wire T-interface conveying a 192 kilobits per second bit stream in each direction on a separate pair of wires. Also recall that 144 kilobits per second are used to convey user information including message signaling and that the 144 kilobits per second comprises two 64 kilobits per second circuit-switched B-channels and one 16 kilobits per second packet-switched D-channel. User terminal 1001 transmits the 192 kilobits per second bit stream in 48-bit line frames at the rate of 4000 line frames per second. Each 48-bit line frame includes a framing bit that uses a bipolar violation to mark the start of a frame, various other control bits, DC balancing bits, superframe bits and spare bits and also includes two, 8-bit occurrences of each of the two B-channels and two, 2-bit occurrences of the single D-channel. Digital line circuit 1105 receives the 192 kilobits per second bit stream from user terminal 1001 via transformer coupling to provide DC isolation, common mode signal rejection and overvoltage protection. Digital line circuit 1105 detects the start of each line frame and thereafter stores the information from the two B-channels and the single D-channel in separate registers (not shown). Such received information is thereafter transmitted either to a time-slot assignment unit 1111 on a 32-channel bidirectional bus 1108 or to a second time-slot assignment unit 1112 on another 32-channel bidirectional bus 1109. The information defining the particular time slot or channel on one of the two buses 1108 or 1109 that each B-channel or D-channel is to be transmitted in, is determined based on information received from a line group controller 1106, which coordinates the operation of 16 of the digital line circuits 1105. A given time slot on one of the buses 1108 is used to transmit one 8-bit occurrence of one B-channel from one digital line circuit 1105 or one 2-bit occurrence of the D-channel from each of four of the digital line circuits 1105. Timeslot assignment unit 1111 receives information from each group of 16 line circuits 1105 via one of the buses 1108. Similarly, time-slot assignment unit 1112 receives information from each group of 16 line circuits 1105 via one of the buses 1109. The buses 1108 and 1109 can be load-shared in accordance with the assignments by the line group controllers 1106 defining the mapping between user B-channels and D-channels and time slots on the buses 1108 and 1109. The line group controllers 1106 in turn receive their information from a single line unit controller 1107 which communicates with control unit 1017 via communication path 1027 to initialize such mapping. Line unit controller 1107 also controls the operation of the time-slot assignment units 1111 and 1112. The function of the time-slot assignment units 1111 and 1112 is to place the time slots received from the digital line circuits 1105, on specified time slots of the 32-channel bidirectional data buses 1201 to time-slot interchange unit 1011 or on specified time slots of the 32-channel bidirectional data buses 1202 to packet switch unit 1400. Recall that the buses 1201 convey primarily B-channel information but that some D-channel information is conveyed thereon and subsequently transmitted in predetermined channels via time-slot interchange unit 1011 and bus 1205 to packet switching unit 1400. The buses 1202 convey only D-channel information directly to packet switching unit 1400.

Time slot assignment units 1111 and 1112 also operate to receive information from time-slot interchange unit 1011 on the buses 1201 and from packet switching unit 1400 on the buses 1202 and to transmit such received information in the specified time slots to the digital line circuits 1105. Each digital line circuit 1105 receives its two B-channels and its single D-channel from associated time slots on the buses 1108 and/or 1109 and formats the received information into 48-bit line frames. Such line frames are then transmitted via transformer coupling to the user line, e.g., 1003, at the 192 kilobits per second rate.

Packet Switching Unit 1400

Figure 5:
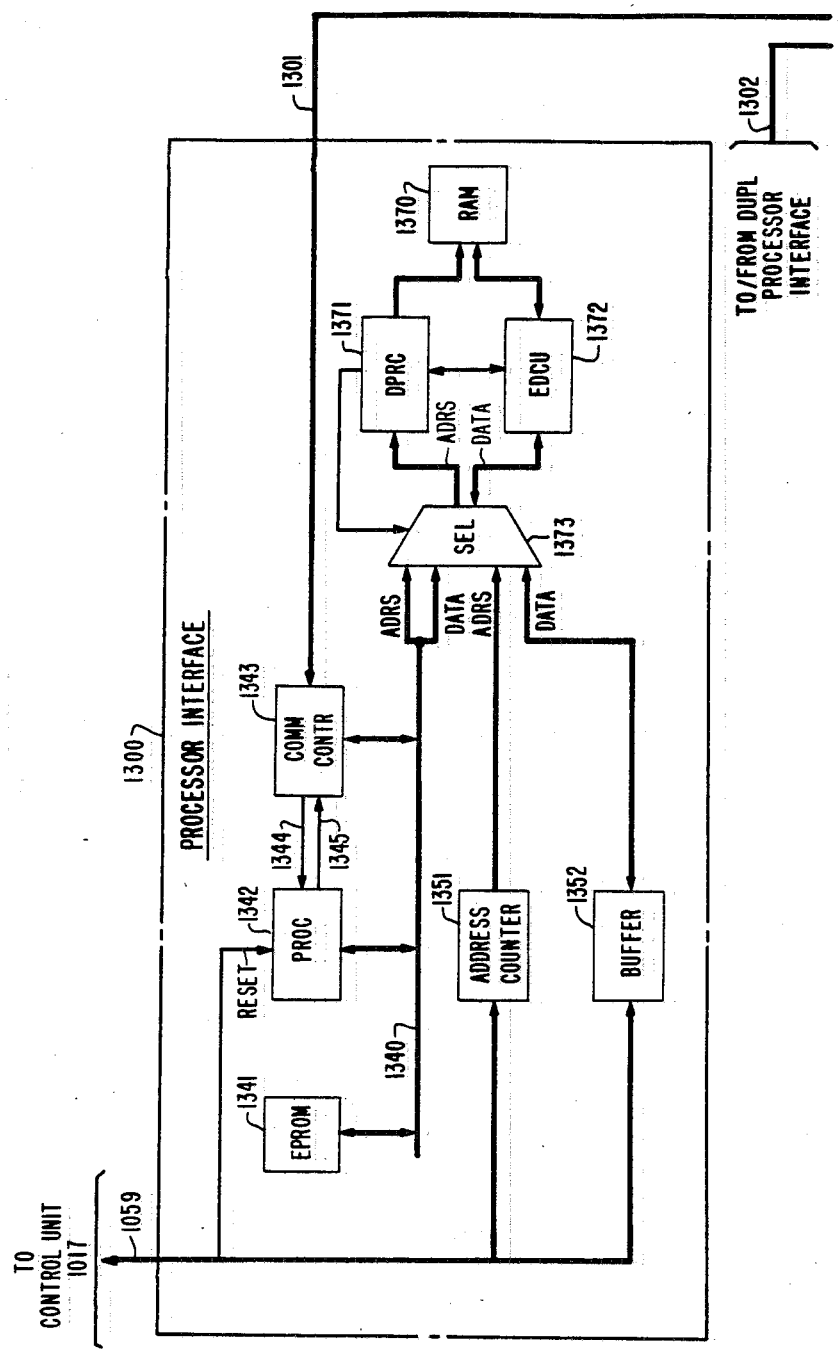
FIG. 5 through 11, when arranged in accordance with FIG. 13, is a more detailed diagram of a packet switching unit and a processor interface included in the system of FIG. 1 through 3.
Figure 9:
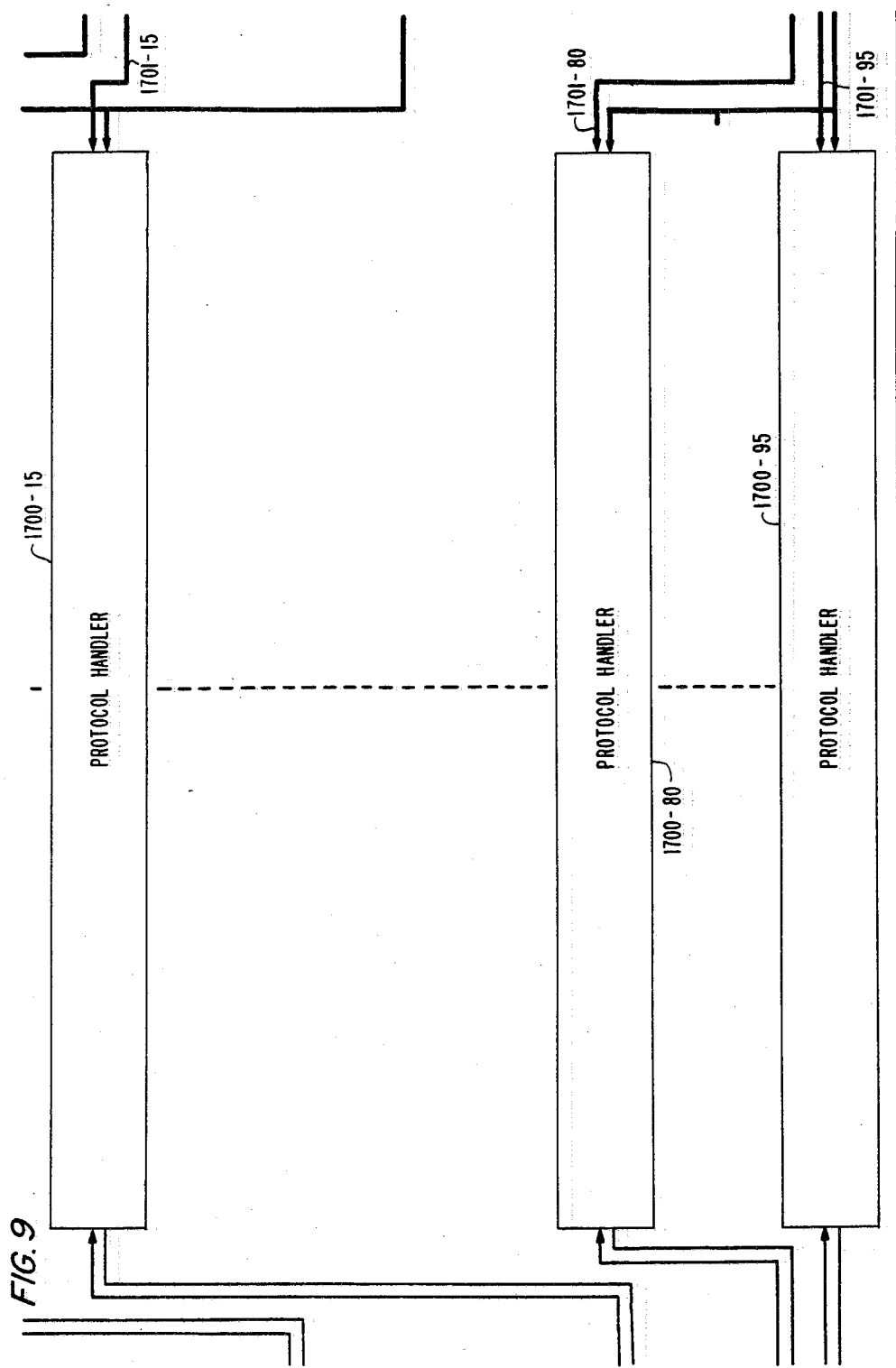
Figure 10:
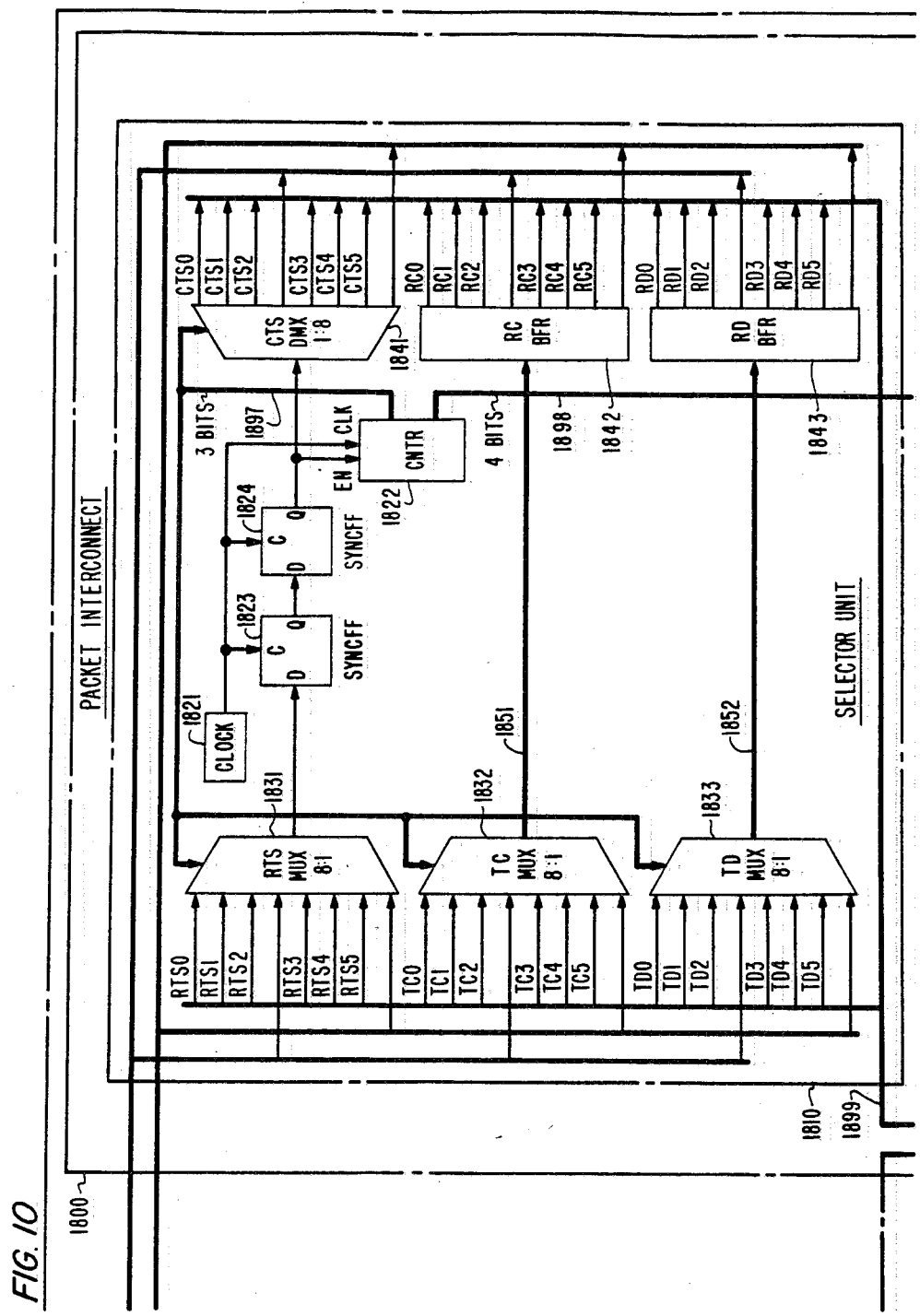
Figure 11:
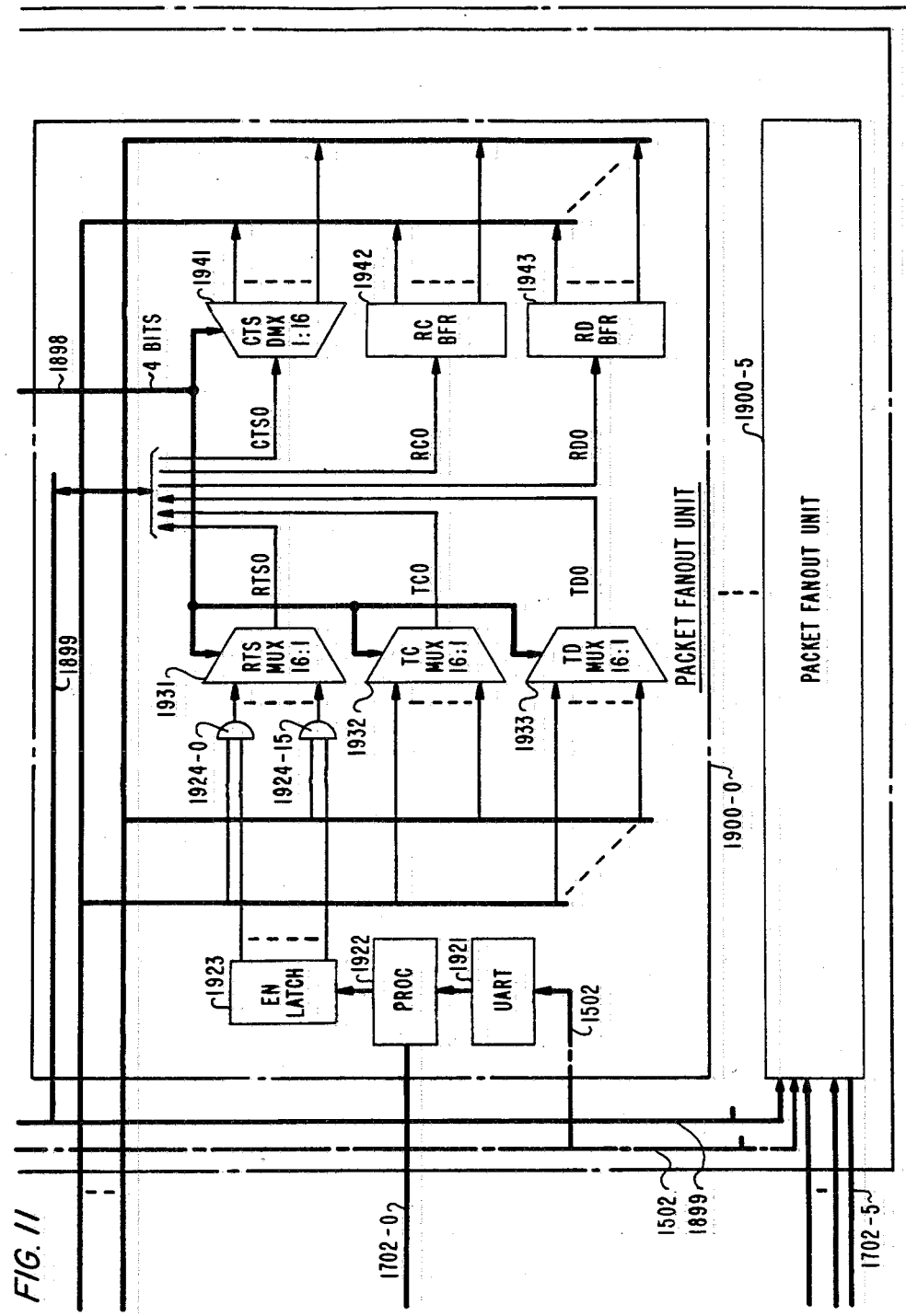

A more detailed diagram of packet switching unit 1400 and processor interface 1300 is presented in FIG. 5 through 11, arranged in accordance with FIG. 13. Packet switching unit 1400 includes six data fanout units 1600-0 through 1600-5 (FIG. 7) which distribute the time slots received on the buses 1202 from digital line units 1101 and 1102 and on the bus 1205 from time-slot interchange unit 1011, to 96 protocol handlers 1700-0 through 1700-95, only protocol handlers 1700-0, 1700-15, 1700-80 and 1700-95 being specifically shown in FIG. 8 and 9. Data fanout units 1600-0 through 1600-5 also transmit information received from the protocol handlers, in the assigned time slots on the buses 1202 to digital line units 1101 and 1102 and on the bus 1205 to time-slot interchange unit 1011. Each data fanout unit is associated with sixteen protocol handlers. For example, data fanout unit 1600-0 is associated with protocol handlers 1700-0 through 1700-15 and data fanout unit 1600-5 is associated with protocol handlers 1700-80 through 1700-95 The data fanout units 1600-0 through 1600-5 receive assignment information, referred to herein as assignment signals, concerning the mapping of time slots between the protocol handlers and the buses 1202 and 1205, from control unit 1017 via communication path 1027, a control fanout unit 1500 (FIG. 6) and a control bus 1501. The protocol handlers 1700-0 through 1700-95 receive, process and store packets from the D-channels of the user terminals associated therewith (or inter-module packets via bus 1205), and when enabled by packet interconnect 1800 (FIG. 10 and 11) transmit such stored packets to destination protocol handlers or, in the case of signaling packets, to processor interface 1300 (FIG. 5). Destination protocol handlers store the packets received from packet interconnect 1800 and subsequently transmit those packets in the D-channels of destination user terminals. Processor interface 1300, in response to signaling packets from protocol handlers, stores such signaling packets to be subsequently read by control unit 1017 via bus 1059. Processor interface 1300 also receives signaling information written via bus 1059 by control unit 1017, stores such information in signaling packets, and, when enabled by packet interconnect 1800, transmits the signaling packets to destination protocol handlers. At any given time, a number of the protocol handlers may be designated as spares. Such spare designation and other configuration and control information is transmitted by control unit 1017 via communication path 1027, control fanout unit 1500 and a control bus 1502 to packet interconnect 1800. Packet interconnect 1800 also distributes certain control information to specific protocol handlers via control buses 1702-0 through 1702-5 (FIG. 9). Packet interconnect 1800 includes six packet fanout units 1900-0 through 1900-5 (FIG. 11). Each packet fanout unit receives packets from and transmits packets to sixteen protocol handlers. For example, packet fanout unit 1900-0 receives packets from and transmits packets to protocol handlers 1700-0 through 1700-15 and packet fanout unit 1900-5 receives packets from and transmits packets to protocol handlers 1700-80 through 1700-95.

Data Fanout Unit 1600-0

Figure 6:
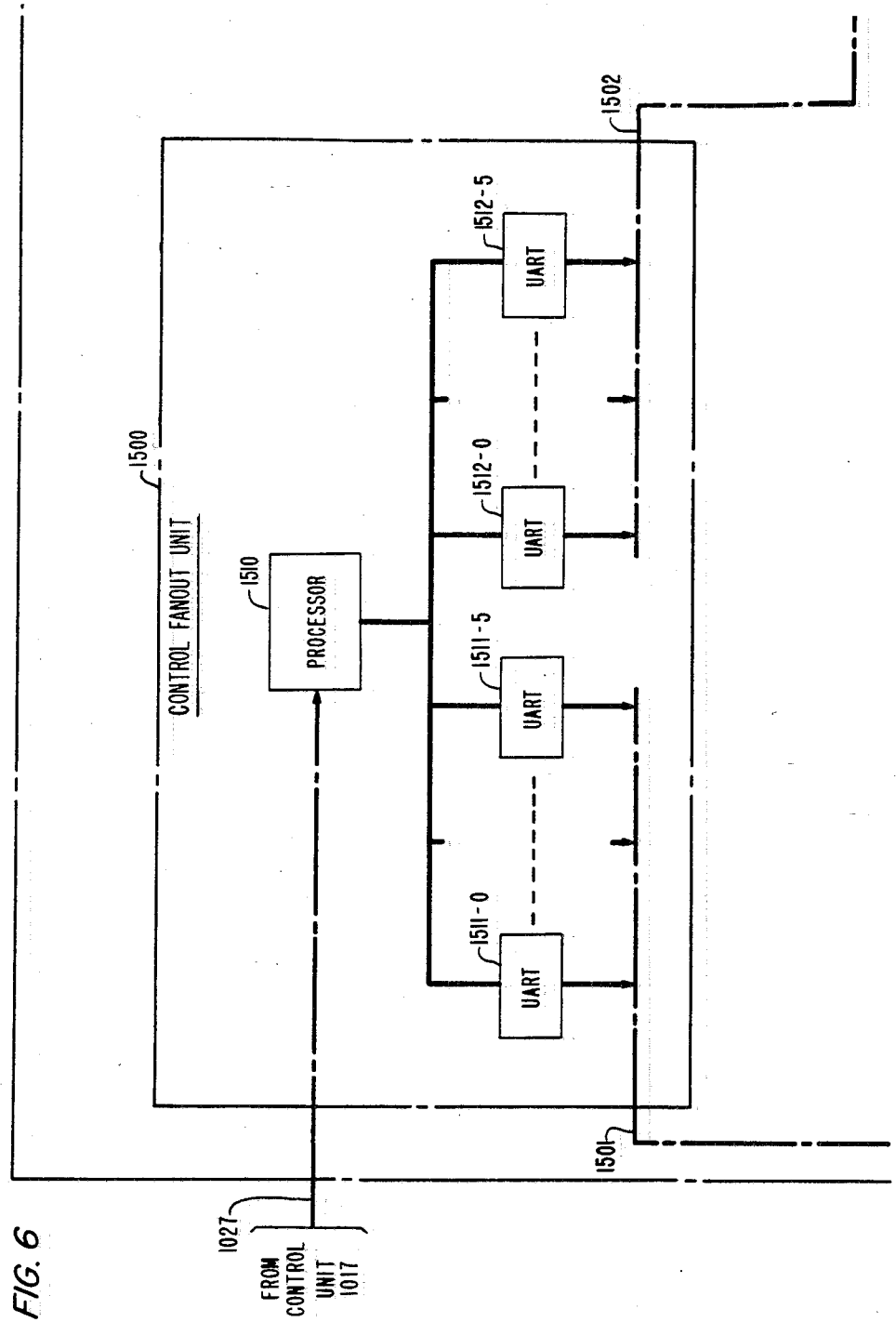

Data fanout unit 1600-0 (FIG. 7) includes a multiplexer 1610 which receives the time slots from digital line units 1101 and 1102 on the 32-channel buses 1202 and from time-slot interchange unit 1011 on the 32-channel bus 1205 and transmits such received time slots on a single time-multiplexed line 1612 to a receive time-slot interchanger 1650. Receive time-slot interchanger 1650 performs the time-slot interchange function by transmitting the information received from multiplexer 1610, in predefined time slots on a time-multiplexed line 1613 to a demultiplexer 1620. The time-slot definitions used by receive time-slot interchanger 1650 are stored in a control RAM 1655 at system initialization or upon a subsequent system reconfiguration, by a processor 1632. Processor 1632 receives such time-slot definitions via a universal asynchronous receiver transmitter (UART) 1631, control bus 1501 and an associated UART 1511-0, from a processor 1510 included in control fanout unit 1500 (FIG. 6). Demultiplexer 1620 distributes the time slots on time-multiplexed line 1613 in a predetermined manner to sixteen, 32-channel bidirectional data buses 1601-0 through 1601-15 connected to the 16 protocol handlers 1700-0 through 1700-15 associated with data fanout unit 1600-0. Similarly, in the reverse direction, a multiplexer 1621 receives the time slots on the 32-channel buses 1601-0 through 1601-15 from protocol handlers 1700-0 through 1700-15 and transmits the received time slots on a single time-multiplexed line 1614 to a transmit time-slot interchanger 1653. In accordance with the time-slot definitions stored in control RAM 1655, transmit time-slot interchanger 1653 transmits the information received from multiplexer 1621 on a single time-multiplexed line 1615 to a demultiplexer 1611. Demultiplexer 1611 then distributes the time slots received on time-multiplexed line 1615 in a predetermined manner to the buses 1202 for transmission to the digital line units 1101 and 1102, and to bus 1205 for transmission to time-slot interchange unit 1011. Note that bus 1205 is connected to only one of the data fanout units, unit 1600-0. Data fanout unit 1600-0 receives timing signals from time-slot interchange unit 1011 via bus 1205 and distributes such timing signals to each of the data fanout units 1600-1 through 1600-5 as well as to time slot assignment and rate adapt units included in the protocol handlers, e.g., unit 1405 in protocol handler 1700-0 (FIG. 8), to properly time the operation of the various components therein. The distribution of timing signals is not shown in the drawing. Although the operation of data fanout unit 1600-0 is generally similar to that of time-slot interchange unit 11 (FIG. 23) already described, it is noted that whereas time-slot interchange unit 11 performs a circuit switching function, i.e., interchanging time slots to provide communication channels for calls, data fanout unit 1600-0 performs only a distribution function by mapping each time slot on the buses 1202 and 1205 to any specified time slot on the buses 1601-0 through 1601-15 on a relatively permanent basis and performs no switching function with respect to calls.

Protocol Handler 1700-0

Protocol handler 1700-0 (FIG. 8) includes a time-slot assignment and rate adapt unit 1405 which interfaces the bidirectional data bus 1601-0 from data fanout unit 1600-0, to 32 HDLC circuits 1406-0 through 1406-31. Each HDLC circuit, e.g., 1406-0, is used to terminate the HDLC link-level protocol from the 16 kilobits per second D-channel of one user terminal and is also referred to herein as a protocol processor. Recall that a given channel or time slot on data bus 1601-0 is used for up to four D-channels, i.e., eight bits comprised of two bits from each D-channel. Time slot assignment and rate adapt unit 1405 includes 32 incoming shift registers (not shown) and 32 outgoing shift registers (not shown), one incoming shift register and one outgoing shift register for each HDLC circuit. A given incoming shift register receives two bits from a predetermined time slot on data bus 1601-0 during each 125-microsecond frame. After four such frames, the given incoming shift register has accumulated eight bits and unit 1405 transmits a clock signal to the associated HDLC circuit, e.g., 1406-0, and the accumulated eight bits are transmitted into HDLC circuit 1406-0. Since the given incoming shift register receives information from only one time slot per 125-microsecond frame, the bits can be transmitted from the incoming shift register to HDLC circuit 1406-0 at a lower rate than they were received from data bus 1601-0. In the reverse direction, HDLC circuit 1406-0 transmits eight bits to a given outgoing shift register, and those bits are inserted in the predetermined time slot on data bus 1601-0. Two bits are inserted during each occurrence of the predetermined time slot over four 125-microsecond frames. Time-slot assignment and rate adapt unit 1405 can also be reconfigured such that a given HLDC circuit can terminate D-channels at higher rates, e.g., 64 or 256 kilobits per second, using multiple incoming and outgoing shift registers and multiple time slots.

Protocol handler 1700-0 includes three control entities: a processor 1442, a DMA processor 1423 and a communications controller 1443. DMA processor 1423, e.g., the Intel 80186, is a lower-level processor responsible for the transfer of information via a bus 1420 between the HDLC circuits 1406-0 through 1406-31 and buffers in a RAM 1470. Communications controller 1443, e.g., the Intel 82586, performs a similar function with respect to the transfer of information via a bus 1440, between the bus 1701-0 (connected to packet interconnect 1800) and buffers in RAM 1470. Processor 1442, e.g., the Intel 80186, represents the higher intelligence of protocol handler 1700-0. DMA processor 1423 has an associated erasable programmable read only memory (EPROM) 1421 for storing its program and an associated RAM 1422 for storing its program stack and various local variables. Processor 1442 also has an associated EPROM 1441 for storing its program. Associated with RAM 1470 are a dual port RAM controller 1471, e.g., the Intel 8207, an error detection and correction unit 1472, e.g., the Intel 8206, and a selector 1473. In the present embodiment, RAM 1470 has 256K, 22-bit locations and is implemented as 22 memories each having 256K, one-bit locations. Each location of RAM 1470 is used to store a 16-bit data word and a six-bit error check code generated by error detection and correction unit 1472. The error check code is used by unit 1472 to correct all single-bit errors and to detect all double-bit errors in data words being read from RAM 1470. Dual port RAM controller 1471 transmits a select signal to selector 1473 to define which one of the two buses 1420 and 1440 has access to RAM 1470 at any given time. RAM 1470 includes two system control blocks (not shown), one associated with DMA processor 1423 and the other associated with communications controller 1443. Processor 1442 controls the operation of DMA processor 1423 and communications controller 1443 by writing control information via bus 1440 into the appropriate system control block of RAM 1470 and then transmitting a control signal either via a conductor 1431 to DMA processor 1423 or via a conductor 1445 to communications controller 1443. In response to such control signals, DMA processor 1423 and communications controller 1443 read their associated system control blocks in RAM 1470 to determine what action has been requested by processor 1442. RAM 1470 further includes a plurality of buffers of a predetermined size used for storing packets received from HDLC circuits 1406-0 through 1406-31 and packets received from packet interconnect 1800 via bus 1701-0. Each such buffer has an associated buffer control block which defines certain characteristics of the buffer, e.g., buffer size. A given packet may require several buffers connected as a chain. Each buffer control block defines the location of the next buffer in such a chain.

At system initialization, control unit 1017 effects via communication path 1027, control fanout unit 1500 and control bus 1502, the transmission by a processor 1922 (FIG. 11) of a reset signal on a conductor of bus 1702-0 to processor 1442. In response, processor 1442 returns to a known state and then writes via bus 1440 a read command into the RAM 1470 system control block for communications controller 1443. Processor 1442 then transmits a control signal on conductor 1445 to communications controller 1443 and, in response, communications controller 1443 reads its RAM 1470 system control block. That system control block also includes information defining the list of available buffers to be used by communications controller 1443 for storing packets. In response to the read command in its system control block, communications controller 1443 begins listening on the bus 1701-0 for the beginning of a packet. As part of the initialization, control unit 1017 transmits initialization information to processor interface 1300. Processor interface 1300 (which has previously been initialized by control unit 1017 in a manner similar to that being described for protocol handler 1700-0) then transmits a packet containing the initialization information via packet interconnect 1800 and bus 1701-0 to protocol handler 1700-0. Communications controller 1443 detects the beginning of the packet and assigns one or more of its available buffers in RAM 1470 to be used to store the packet. When communications controller 1443 detects the end of the packet, it transmits an interrupt signal via a conductor 1444 to processor 1442. In response to the interrupt signal, processor 1442 reads the initialization packet from RAM 1470. The initialization packet contains system configuration information. Such information includes a definition of the configuration of time-slot assignment and rate adapt unit 1405, e.g., the association of time slots on data bus 1601-0 with particular HDLC circuits for operation at various defined bit rates such as 16, 64 or 256 kilobits per second. Processor 1442 transmits such configuration information to time-slot assignment and rate adapt unit 1405 via bus 1440. Processor 1442 then effects the transmission by communications controller 1443 of an acknowledgment packet via packet interconnect 1800 to processor interface 1300. The acknowledgment packet is in turn read by control unit 1017. In response, control unit 1017 effects the transmission a further initialization packet to the RAM 1470 of protocol handler 1700-0. Processor 1442 then reads this packet from RAM 1470. The packet defines that certain ones of the HDLC circuits are presently associated with active user terminals. In response to the packet, processor 1442 writes a command into the RAM 1470 system control block for DMA processor 1423. Processor 1442 then transmits a control signal via conductor 1431 to DMA processor 1423 and, in response, DMA processor 1423 reads the command in its system control block via bus 1420. Based on the command, DMA processor 1423 transmits control information via bus 1420 requesting that certain ones of the HDLC circuits 1406-0 through 1406-31, initialize HDLC communication links with peer HDLC circuits (not shown) in their associated user terminals. The link initialization includes the continuous transmission of idle flags by the HDLC circuits at each end of the link. The HDLC circuits perform the HDLC link-level functions such as bit stuffing, error checking, etc. in a manner well known in the art. DMA processor 1423 repetitively scans each of the HDLC circuits 1406-0 through 1406-31 to determine when the beginning of a packet has been received. Upon determining, that an HDLC circuit, e.g., 1406-0, has received the beginning of a packet, processor 1423 selects an available RAM 1470 buffer to be used to store at least the initial portion of the packet. Processor 1423 stores the address of the selected buffer in its associated RAM 1422. Thereafter, each byte received by HDLC circuit 1406-0 is transferred via bus 1420 to the selected RAM 1470 buffer based on the address stored in RAM 1422. (Alternatively, RAM 1422 can be used to temporarily store alternate bytes such that full 16-bit words can be transferred to RAM 1470.) Of course, if the packet is of sufficient length to exceed the first assigned buffer, additional buffers are assigned as needed. The entire chain of buffers used to store the complete packet is linked together via pointers stored in the buffer control blocks associated with the buffers. When HDLC circuit 1406-0 determines that the entire packet has been received, its stores a bit so indicating in an internal register (not shown). It also stores a bit indicating whether the HDLC frame including the packet was received without error. DMA processor 1423 reads the bit indicating the end of a packet and, in response, transmits an interrupt signal via conductor 1432 to processor 1442. In response, processor 1442 reads at least the header of the packet via bus 1440 from RAM 1470. If the header indicates that the packet is a signaling packet, i.e., its header defines logical channel LCN1, processor 1442 effects the transmission by communications controller 1443 of that packet in an internal packet frame via packet interconnect 1800 to processor interface 1300. Part of the internal packet frame defines the physical address of processor interface 1300 as the destination of the packet. On the other hand, if processor 1442 upon reading the header of the packet from RAM 1470, determines that the packet is a data packet, processor 1442 consults a routing table stored in RAM 1470 to determine both the physical address of the destination protocol handler and an internal logical channel number (ILCN) to be used by the destination protocol handler in transmitting the packet to the correct user terminal in the correct logical channel. (The storing of such routing tables in the process of establishing a virtual circuit between two user terminals is described later herein.) Processor 1442 then effects the transmission by communications controller 1443 of the data packet in an internal packet frame via packet interconnect 1800 to the destination protocol handler. The internal packet frame includes both the physical address of the destination protocol handler and the ILCN. The internal packet frame also includes the physical address of the source protocol handler, i.e., 1700-0, to be used by the destination protocol handler in transmitting an acknowledgment packet back to the source protocol handler. Within protocol handler 1700-0, processor 1442 is responsible for all network level functions, e.g., the appropriate routing of signaling and data packets. Processor 1442 is also responsible for effecting the retransmission of an HDLC frame upon a determination via DMA processor 1423 that a frame was received in error.

Communications controller 1443 operates to transfer incoming packets received on bus 1701-0 from packet interconnect 1800 to available buffers in RAM 1470 in a manner analogous to that of DMA processor 1423 in transferring packets from the HDLC circuits 1406-0 through 1406-31 to buffers in RAM 1470. For data packets, processor 1442 again uses the routing table stored in RAM 1470 to effect the transmission of the data packet to the correct HDLC circuit with the correct LCN. Certain of the signaling packets received on bus 1701-0 from packet interconnect 1800 are used by processor 1442 in writing the necessary entries in the routing table of RAM 1470 in the process of establishing virtual circuits. Other signaling packets received on bus 1701-0 are routed based on their ILCNs and the RAM 1470 routing table, to user terminals via the HDLC circuits 1406-0 through 1406-31.

Although not shown in the drawing, protocol handler 1700-0 further includes a duplicate communications controller connected on bus 1440 to interface protocol handler 1700-0 with a duplicate packet interconnect. A register 1447, which stores status bits received via bus 1702-0 from processor 1922, stores a bit defining whether communications controller 1443 or the duplicate communications controller is presently active.

Processor Interface 1300

A substantial portion of processor interface 1300 (FIG. 5) is identical to protocol handler 1700-0. Specifically, EPROM 1341, bus 1340, processor 1342, conductors 1344 and 1345, communications controller 1343, selector 1373, dual port RAM controller 1371, RAM 1370 and error detection and correction unit 1372 are identical to the corresponding elements of protocol handler 1700-0 that are numbered exactly 100 greater. However, instead of receiving information from 32 HDLC circuits as does RAM 1470 in protocol handler 1700-0, RAM 1370 of processor interface 1300 receives information from control unit 1017 via bus 1059 and a buffer 1352. An address counter 1351 is used by control unit 1017 as a means of indirectly addressing locations in RAM 1370. For example, to write certain control information into RAM 1370, control unit 1017 writes the address of the first RAM 1370 buffer to be used to store such information, into address counter 1351. As the first RAM 1370 buffer is filled, address counter 1351 is automatically incremented to define the locations of that buffer. Processor 1342 can be reset by control unit 1017 to reinitialize the system via one conductor of bus 1059.

Packet Interconnect 1800

The protocol handlers 1700-0 through 1700-95 as well as processor interface 1300 and a duplicate processor interface (not shown) are each connected to packet interconnect 1800 (FIG. 10 and 11) by means of a six-conductor bus (or alternatively, a bus comprising six differential pairs). (The duplicate processor interface is used to interface packet interconnect 1800 with a duplicate control unit (not shown) used to control switching module 1000 upon a failure of control unit 1017.) Protocol handlers 1700-0 through 1700-95 are connected to packet interconnect 1800 by the buses 1701-0 through 1701-95. Processor interface 1300 and the duplicate processor interface are connected to packet interconnect 1800 by the buses 1301 and 1302. Each of the buses 1701-0 through 1701-95, 1301 and 1302 is used to transmit three signals to packet interconnect 1800 (a Request To Send (RTS) signal, a Transmit Clock (TC) signal and a Transmit Data (TD) signal) and to receive three signals from packet interconnect 1800 (a Clear To Send (CTS) signal, a Receive Clock (RC) signal and a Receive Data (RD) signal). Protocol handler 1700-0, for example, operates as follows to transmit a packet via packet interconnect 1800. When the communications controller 1443 of protocol handler 1700-0 determines that a packet is ready for transmission to packet interconnect 1800, it transmits a logic zero RTS signal to packet interconnect 1800. Packet interconnect 1800 subsequently returns a logic zero CTS signal to protocol handler 1700-0. In response, the communications controller 1443 of protocol handler 1700-0 transmits the packet as the TD signal to packet interconnect 1800 as well as the bit rate clock as the TC signal. By the operation of packet interconnect 1800, only one protocol handler or processor interface is allowed to transmit at a time. The TD and TC signals transmitted by protocol handler 1700-0 are received by each of the protocol handlers 1700-0 through 1700-95 as well as processor interface 1300 and the duplicate processor interface as their RD and RC signals, respectively. However, typically only one destination is defined by a physical destination address at the beginning of the packet, and only that destination will use the RC signal to clock the bits of the packet into its communication controller for subsequent storage.

Packet interconnect 1800 implements two levels of selection in granting permission to transmit to the protocol handlers and processor interfaces. At the lower level, six packet fanout units 1900-0 through 1900-5 (FIG. 11) are used to select among the 96 protocol handlers 1700-0 through 1700-95. For example, packet fanout unit 1900-0 selects among the 16 protocol handlers 1700-0 through 1700-15 and packet fanout unit 1900-5 selects among the 16 protocol handlers 1700-80 through 1700-95. At the higher level, a selector unit 1810 (FIG. 10) is used to select among the six packet fanout units 1900-0 through 1900-5, processor interface 1300 and the duplicate processor interface. Packet interconnect 1800 implements a fixed selection sequence. By virtue of the two levels of selection, each processor interface is enabled 16 times for each enabling of an individual protocol handler.

Packet fanout unit 1900-0 (FIG. 11) includes three 16:1 multiplexers 1931, 1932 and 1933 that receive the RTS, TC and TD signals, respectively, from the protocol handlers 1700-0 through 1700-15. (The RTS signals from the protocol handlers 1700-0 through 1700-15 are received by 16 AND gates 1924-0 through 1924-15. An enable latch 1923 stores 16 bits defining whether each of the 16 protocol handlers 1700-0 through 1700-15 is presently active or being maintained as a spare. The bits are stored in enable latch 1923 by processor 1922 which receives such information via a UART 1921, control bus 1502, control fanout unit 1500 and communication path 1027 from control unit 1017. When protocol handler 1700-0, for example, is active, enable latch 1923 transmits a logic one signal to AND gate 1924-0. Therefore, the RTS signal from protocol handler 1700-0 is transmitted by AND gate 1924-0 to multiplexer 1931.) By the operation of the multiplexers 1931, 1932 and 1933, the RTS, TC and TD signals transmitted by a selected one of the protocol handlers 1700-0 through 1700-15, are transmitted to selector unit 1810, the higher selection level. Packet fanout unit 1900-0 further includes a 1:16 demultiplexer 1941 by means of which a CTS signal from selector unit 1810 can be transmitted to a selected one of the protocol handlers 1700-0 throu9h 1700-15. The selections made by multiplexers 1931, 1932 and 1933 and demultiplexer 1941 are defined by the four high-order bits generated by a seven-bit binary counter 1822 (FIG. 10) and transmitted to the packet fanout units 1900-0 through 1900-5 via a bus 1898. Thus for a given count of counter 1822, multiplexers 1931, 1932 and 1933 are transmitting the RTS, TC and TD signals received from a given one of the protocol handlers 1700-0 through 1700-15 and demultiplexer 1941 is transmitting a CTS signal to that given protocol handler. Packet fanout unit 1900-0 further includes two buffers 1942 and 1943 used to transmit RC and RD signals received fro selector unit 1810 to each of the protocol handlers 1700-0 through 1700-15. Recall that the RC and RD Signals are broadcast to all the protocol handlers and the processor interfaces but that typically only one destination actually stores the transmitted packet for subsequent transmission. The buffers 1 and 1943 serve to electrically isolate the RC and RD conductors of the buses 1701-0 through 1701-15 while permitting the signals thereon to be broadcast to each of the protocol handlers 1700-0 through 1700-15.

Selector unit 1810, which represents the higher selection level selecting among the six packet fanout units 1900-0 through 1900-5, processor interface 1300 and the duplicate processor interface (not shown), includes three 8:1 multiplexers 1831, 1832 and 1833 which receive the RTS, TC and TD signals from the six packet fanout units and the two processor interfaces. Selector unit 1810 further includes a 1:8 demultiplexer 1841 which transmits a CTS signal to a selected one of the eight possible units, and two buffers 1842 and 1843 which receive the TC and TD signals transmitted by multiplexers 1832 and 1833 via conductors 1851 and 1852, respectively, and transmit the received signals as the RC and RD signals to the eight units. The signals are transmitted between the packet fanout units 1900-0 through 1900-5 and selector unit 1810 via a bus 1899. In FIG. 10 and 11 the conductors of bus 1899 associated with packet fanout unit 1900-0 are designated RTS0, TC0, TD0, CTS0, RC0 and RD0. Similarly, the conductors of bus 1899 associated with packet fanout unit 1900-5 are designated RTS5, TC5, TD5, CTS5, RC5 and RD5. The selections made by multiplexers 1831, 1832 and 1833 and demultiplexer 1841 are defined by the three low-order bits of counter 1822 received via a bus 1897. (The seven bits transmitted by counter 1822 comprise what is referred to herein as a selection signal.) The signal transmitted by multiplexer 1831 is coupled via two series-connected, sync flip-flops 1823 and 1824, both to demultiplexer 1841 and to an enable input terminal of counter 1822. A 16-megahertz clock 1821 is used both to sequence counter 1822 and to clock the flip-flops 1823 and 1824. Flip-flops 1823 and 1824 are included to prevent counter 1822 from going into oscillation as may occur when a signal is received at its enable input terminal at precisely the same time that a transition occurs in the clock signal transmitted by clock 1821. When counter 1822 is on the count 000000, for example, a logic zero RTS signal transmitted by protocol handler 1700-0 is transmitted via multiplexer 1931, conductor RTS0 of bus 1899, multiplexer 1831 and flip-flops 1823 and 1824 to counter 1822 and to demultiplexer 1841. In response to the logic zero RTS signal, counter 1822 stops counting. Demultiplexer 1841 transmits the logic zero signal as a CTS signal via conductor CTS0 of bus 1899 and demultiplexer 1941 to protocol handler 1700-0. In response, protocol handler 1700-0 begins transmitting the bits of its stored packet and the clock associated therewith as its TD and TC signals, respectively. The TD signal is conveyed via multiplexer 1933, conductor TD0 of bus 1899, multiplexer 1833 and conductor 1852 to buffer 1843, from which the signal is broadcast as the RD signal to all 96 protocol handlers and to the two processor interfaces. The TC signal is conveyed via multiplexer 1932, conductor TC0 of bus 1899, multiplexer 1832 and conductor 1851 to buffer 1842, from which the signal is broadcast as the RC signal to all 96 protocol handlers and to the two processor interfaces. Conductor 1852 represents the shared communication path resource of switching module 1000 over which all packets to and from the user terminals, e.g., 1001, 1002, served by switching module 1000 are transmitted. Once protocol handler 1700-0 has completed the transmission of its packet, the logic zero RTS signal is removed and, in response to such removal, the logic zero CTS signal is removed and counter 1822 resumes counting until another competing transmitter is reached that has a logic zero RTS signal indicating its readiness to transmit a packet. (Selector unit 1810 also includes a timeout counter (not shown) whereby the selection sequence is resumed if the logic zero RTS signal is not removed within a predetermined time.) The sequence implemented by packet interconnect 1800 is as follows. First, one protocol handler associated with each of the packet fanout units 1900-0, 1900-1 and 1900-2 is enabled to transmit. Then processor interface 1300 is enabled. Next, one protocol handler associated with each of the packet fanout units 1900-3, 1900-4 and 1900-5 can transmit. Then the duplicate processor interface can transmit. During the next eight counts of counter 1822, a second protocol handler associated with each of the packet fanout units 1900-0, 1900-1 and 1900-2, then processor interface 1300, then a second protocol handler associated with each of the packet fanout units 1900-3, 1900-4 and 1900-5 and finally the duplicate processor interface are sequentially enabled to transmit. The complete sequence comprises 128 counts of counter 1822 during which each of the protocol handlers is enabled once to transmit and each of the processor interfaces is enabled 16 times.

Control Fanout Unit 1500

Control fanout unit 1500 (FIG. 6) comprises a processor 1510, which communicates with control unit 1017 via communication path 1027, and ten UARTS 1511-0 through 1511-5 and 1512-0 through 1512-5. Each of the UARTS 1511-0 through 1511-5 communicates with an associated UART in one of the data fanout units 1600-0 through 1600-5. For example, UART 1511-0 communicates with UART 1631 of data fanout unit 1600-0 via a portion of control bus 1501 to allow processor 1510 to control processor 1632. Such control includes, for example, defining the mapping of time slots between the buses 1202 and 1205 from digital line units 1101 and 1102 and time-slot interchange unit 1011, to the buses 1601-0 through 1601-15 to protocol handlers 1700-0 through 1700-15. Each of the UARTS 1512-0 through 1512-5 communicates with an associated UART in one of the packet fanout units 1900-0 through 1900-5. For example, UART 1512-0 communicates with UART 1921 of packet fanout unit 1900-0 via a portion of control bus 1502 to allow processor 1510 to control processor 1922. Such control includes the definition of which ones of the protocol handlers 1700-0 through 1700-15 and which one of the duplicate communications controllers in each protocol handler are to be designated as active.

Circuit-Switched Calls

The method of establishing circuit-switched calls varies from the method previously described with respect to FIG. 27 only in that message signaling is used between user terminals and the switching system and in that a given user terminal can have two circuit-switched calls to different parties active simultaneously using the two B-channels. Message signaling is implemented in switching module 1000 (FIG. 2) by transmitting signaling packets on the user D-channel to the associated protocol handler and switching those packets via packet interconnect 1800 to processor interface 1300. The signaling information is then read from processor interface 1300 by control unit 1017. Control information from control unit 1017 is transmitted in signaling packets by processor interface 1300 via packet interconnect 1800 to a given protocol handler and then to one of its associated user D-channels. A call between user terminal 1001 and subscriber set 23, for example, involves message signaling within switching module 1000 between the D-channel of user terminal 1001 and control unit 1017 at one end of the call and conventional in-band signaling within switching module 501 between subscriber set 23 and control unit 17 at the other end of the call.

FIG. 14 is a time sequence diagram describing the flow of messages between user terminals 1001 and 4001 and the switching system in order to establish a circuit-switched call from user terminal 1001 to user terminal 4001. Initially, user terminal 1001 transmits a SETUP message to the switching system indicating a request to complete a call of a certain type to user terminal 4001. The SETUP message includes the directory number of user terminal 4001 and which of the two B-channels of user terminal 1001 is to be used. The switching system returns a SETUP ACK message to user terminal 1001 verifying the receipt of the SETUP message and then transmits a SETUP message to user terminal 4001 indicating the arrival of an incoming call. The SETUP message is transmitted to user terminal 4001 after the switching system has routed the call. The message includes the call type and the B-channel of user terminal 4001 selected by the switching system for the call. User terminal 4001 returns an ALERTING message to the switching system confirming the arrival of the SETUP message and transferring call progress information equivalent to audible ringing tones. The switching system forwards the ALERTING message to user terminal 1001. When the user at user terminal 4001 answers the incoming call, user terminal 4001 transmits a CONNECT message to the switching system which, in response, establishes a circuit-switched communication channel from the B-channel of user terminal 1001 to the selected B-channel of user terminal 4001. The switching system informs user terminals 1001 and 4001 that the call has been setup by forwarding the CONNECT message to user terminal 1001 and returning a CONNECT ACK message to user terminal 4001. The parties can now communicate.

Either user terminal 1001 or user terminal 4001 can initiate disconnection of the call by transmitting a DISCONNECT message to the switching system. The switching system disconnects the B-channels of the call, idles call-associated resources and transmits a DISCONNECT message to the other user terminal, which returns a DISCONNECT ACK message verifying the successful completion of disconnection procedures.

Intra-Module Packet-Switched Call Example

Figure 15:
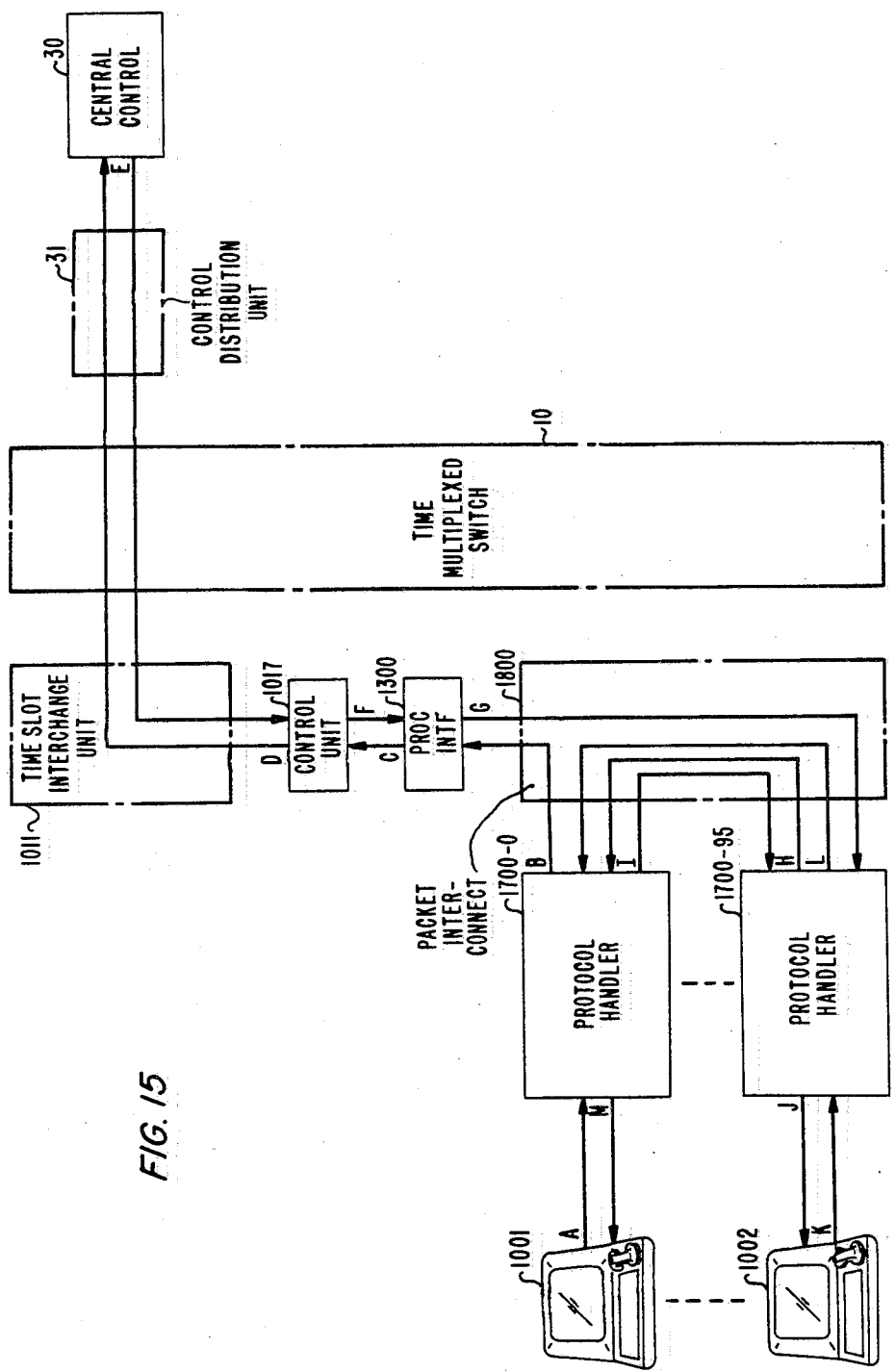
FIGS. 15 and 16 are functional diagrams of communication sequences involved in the setup and removal of an intra-module packet-switched call in the system of FIG. 1 through 3.

The following is example describing the setup and removal of an intra-module packet-switched call between user terminals 1001 and 1002. The necessary communications are indicated in FIG. 15 by a line, terminating with an arrowhead to indicate its direction, having an associated letter (A) through (M). To initiate the call, user terminal 1001 transmits a call request packet (A) in logical channel LCN1, to its associated protocol handler 1700-0. Protocol handler 1700-0 processes the call request packet including the task of verifying that the logical channel number LCN2, of user terminal 1001 is presently idle. Protocol handler 1700-0 selects an internal logical channel number (ILCN), e.g., ILCN3, to be associated with the call and to be used by the destination protocol handler in transmitting packets to protocol handler 1700-0. Protocol handler 1700-0 then stores an entry in its routing table mapping ILCN3 to LCN2 of user terminal 1001. (The entry is the upper entry in the protocol handler 1700-0 routing table shown in FIG. 17. The underscoring of ILCN3 in that entry indicated that protocol handler 1700-0 made the selection of ILCN3.) Protocol handler 1700-0 then transmits a packet origination request (B) via packet interconnect 1800 to processor interface 1300. The packet origination request defines the originating user terminal 1001, the called directory number and ILCN3 selected for the call by protocol handler 1700-0. The packet origination request is then read (C) from processor interface 1300 by control unit 1017. Control unit 1017 inserts the information of the packet origination request into a control message (D) and transmits that control message via time-slot interchange unit 1011, the predetermined control channel 55 of time-multiplexed switch 10 and via control distribution unit 31 to central control 30. Central control 30 translates the called directory number which, in the present example, defines user terminal 1002. Central control 30 then transmits a packet termination request (E) defining the called user terminal 1002, via control distribution unit 31, the time-multiplexed switch 10 control channel 55 and time-slot interchange unit 1011 to control unit 1017. Control unit 1017 maps the called user terminal 1002 to its associated protocol handler, e.g., 1700-95, and verifies that protocol handler 1700-95 and user terminal 1002 are both presently in service. Control unit 1017 then forwards the packet termination request (F) on to processor interface 1300. Based on the information defining the destination protocol handler 1700-95, processor interface 1300 transmits the packet termination request (G) via packet interconnect 1800 to protocol handler 1700-95. In response, protocol handler 1700-95 selects an internal logical channel number, e.g., ILCN8, it will associate with the call. Protocol handler 1700-95 stores an entry in its routing table (FIG. 17) mapping ILCN8 to LCN2 of user terminal 1002. Protocol handler 1700-95 then transmits a packet path setup message (H) containing information defining both ILCN3 and ILCN8, via packet interconnect 1800 to protocol handler 1700-0. In response, protocol handler 1700-0 stores a second entry in its routing table (FIG. 17) mapping LCN2 of user terminal 1001 to ILCN8 and protocol handler 1700-95. Then protocol handler 1700-0 transmits a packet setup complete message (I) via packet interconnect 1800 to protocol handler 1700-95. In response, protocol handler 1700-95 stores a second entry in its routing table (FIG. 17) mapping LCN2 of user terminal 1002 to ILCN3 and protocol handler 1700-0. Protocol handler 1700-95 then transmits an incoming call packet (J) to user terminal 1002. User terminal 1002 returns a call accepted packet (K) to protocol handler 1700-95, which, in response, transmits a packet path connected indication (L) via packet interconnect 1800 to protocol handler 1700-0. Finally, protocol handler 1700-0 transmits a call connected packet (M) to user terminal 1001 and the packet-switched communication channel between user terminals 1001 and 1002 has been established.

During the call, the routing table entries stored in the protocol handlers 1700-0 and 1700-95 are used to switch data packets between user terminals 1001 and 1002 (FIG. 17). Data packets received by protocol handler 1700-0 from LCN2 of user terminal 1001, are transmitted using ILCN8 via packet interconnect 1800 to protocol handler 1700-95. Data packets received by protocol handler 1700-95 from packet interconnect 1800 in ILCN8, are transmitted in LCN2 to user terminal 1002. In the other direction, data packets received by protocol handler 1700-95 from LCN2 of user terminal 1002, are transmitted using ILCN3 via packet interconnect 1800 to protocol handler 1700-0. Data packets received by protocol handler 1700-0 from packet interconnect 1800 in ILCN3, are transmitted in LCN2 to user terminal 1001.

Figure 16:
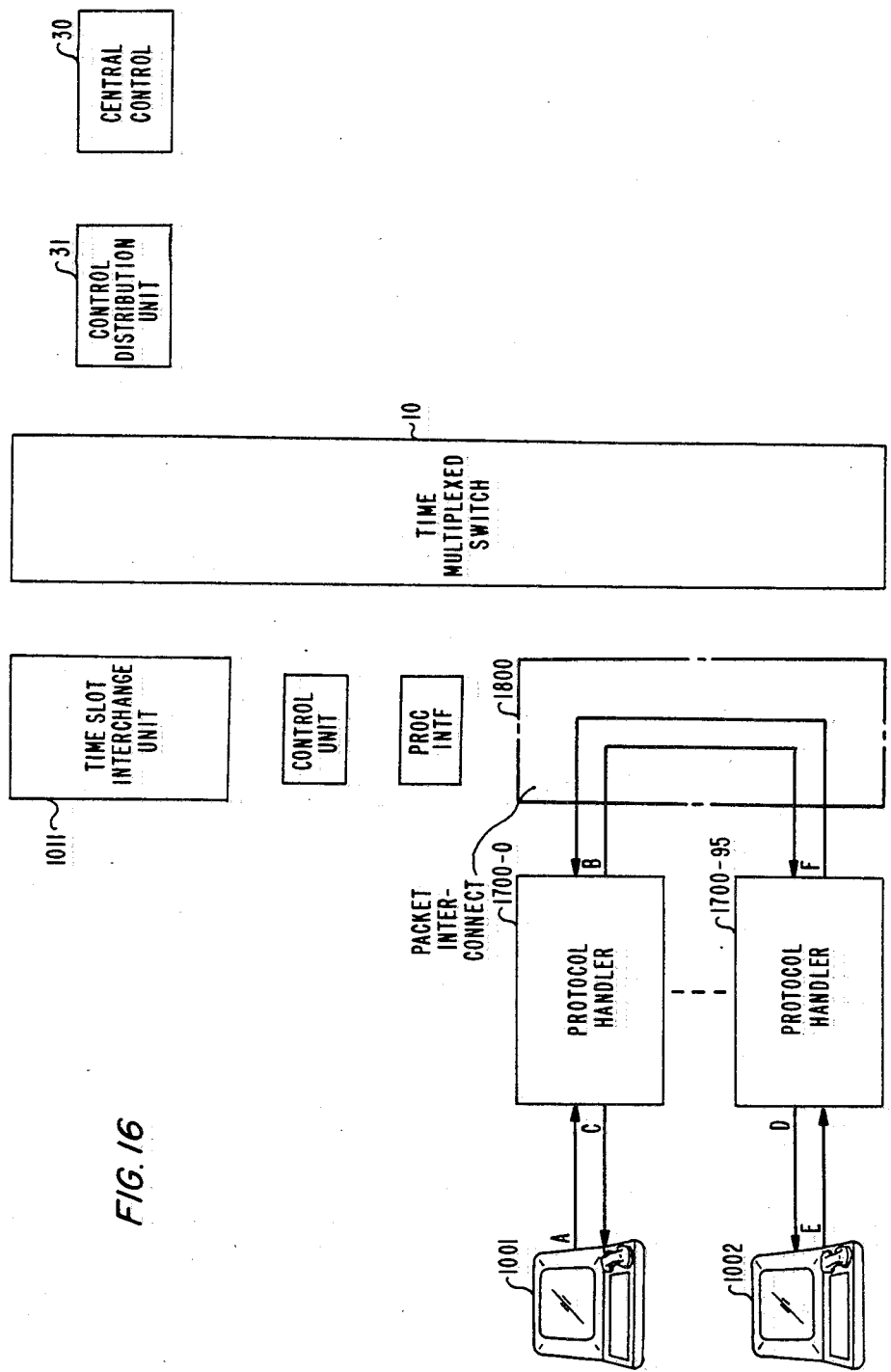

The sequence of messages required to disconnect the call is shown in FIG. 16. User terminal 1001 transmits a clear request packet (A) to protocol handler 1700-0. In response, protocol handler 1700-0 marks LCN2 of user terminal 1001 as idle and transmits a clear message (B) via packet interconnect 1800 to protocol handler 1700-95. Protocol handler 1700-0 also transmits a clear confirmation packet (C) to user terminal 1001. In response to the clear message (B), protocol handler 1700-95 transmits a clear indication packet (D) to user terminal 1002. User terminal 1002 responds by returning a clear confirmation packet (E) to protocol handler 1700-95. In response, protocol handler 1700-95 marks both LCN2 of user terminal 1002 and ILCN8 as idle. Protocol handler 1700-95 then transmits a confirm message (F) via packet interconnect 1800 to protocol handler 1700-0. In response, protocol handler 1700-0 marks ILCN3 as idle and the disconnection sequence is complete. Note that the only involvement of central control 30 and control unit 1017 in the setup and removal of the packet-switched call is in the initial routing of the call.

Inter-Module Packet-Switched Call Example

The establishment of an inter-module packet-switched call from user terminal 1001 to user terminal 4001 involves the coordination of two protocol handlers, 1700-0 and 1700-1, in packet switching unit 1400 and two protocol handlers, 4700-0 and 4700-1, in packet switching unit 4400. To initiate the call, user terminal 1001 transmits a call request packet in logical channel LCN1, to its associated protocol handler 1700-0. Protocol handler 1700-0 processes the call request packet including the task of verifying that the logical channel number LCN2, of user terminal 1001 is presently idle. Protocol handler 1700-0 selects an internal logical channel number (ILCN), e.g., ILCN9, to be associated with the call and to be used by the inter-module protocol handler 1700-1 in transmitting packets to protocol handler 1700-0. Protocol handler 1700-0 then stores an entry in its routing table mapping ILCN9 to LCN2 of user terminal 1001 (FIG. 18). Protocol handler 1700-0 then transmits a packet origination request via packet interconnect 1800 to processor interface 1300. The packet origination request defines the originating user terminal 1001, the called directory number and ILCN9 selected for the call by protocol handler 1700-0. The packet origination request is then read from processor interface 1300 by control unit 1017. Control unit 1017 inserts the information of the packet origination request into a control message and transmits that control message via time-slot interchange unit 1011, the predetermined control channel 55 of time-multiplexed switch 10 and via control distribution unit 31 to central control 30. Central control 30 translates the called directory number which, in the present example, defines user terminal 4001. Central control 30 then transmits a packet termination request defining the called user terminal 4001, via control distribution unit 31, the time-multiplexed switch 10 control channel 61 and time-slot interchange unit 4011 to control unit 4017. Control unit 4017 maps the called user terminal 4001 to its associated protocol handler, e.g., 4700-0, and verifies that protocol handler 4700-0 and user terminal 4001 are both presently in service. Control unit 4017 then forwards the packet termination request on to processor interface 4300. Based on the information defining the destination protocol handler 4700-0, processor interface 4300 transmits the packet termination request via packet interconnect 4800 to protocol handler 4700-0. Protocol handlers 4700-0 determines based on a parameter in the packet termination request that the call is an intermodule call. Protocol handler 4700-0 thereafter exchanges control messages with the inter-module protocol handler 4700-1 to establish a packet-switched channel therebetween. Subsequently protocol handler 4700-1 exchanges control messages with the inter-module protocol handler 1700-1 in switching module 1000 and establishes a channel between the two inter-module protocol handlers. The communications between protocol handlers 4700-1 and 1700-1 are transmitted via the four predetermined channels of bus 4205, time-slot interchange unit 4011, time-multiplexed switch 10 channels 109 through 112 between input/output port pairs P61 and P55, time-slot interchange unit 1011 and the four predetermined channels of bus 1205 to protocol handler 1700-1. Recall that the predetermined channels between protocol handlers 4700-1 and 1700-1 can be used to convey packets at 256 kilobits per second, 64 kilobits per second or various other rates. Finally, protocol handler 1700-1 exchanges control messages with protocol handler 1700-0 to complete the packet-switched channel from protocol handler 4700-0 to protocol handler 1700-0. The additional steps required to set up the call are the same as in the intra-module call example described above.

Exemplary routing table entries in the various protocol handlers 1700-0, 1700-1, 4700-1 and 4700-0 for the above-described inter-module call are shown in FIG. 18. The logical channel numbers used on the inter-module channel are referred to as inter-module logical channel numbers (IMLCN). As with the intra-module call, the originating protocol handler and the terminating protocol handler each select the ILCN used to determine which packets received from the packet interconnect are associated with the particular call. The inter-module protocol handlers each select both the ILCN and the IMLCN needed to associate packets received from the packet interconnect and from the inter-module channel, respectively, with the call. In accordance with the example shown in FIG. 18, once the call has been set up, data packets received by protocol handler 1700-0 from LCN2 of user terminal 1001, are transmitted via packet interconnect 1800 in ILCN4 to protocol handler 1700-1. Packets received by protocol handler 1700-1 from packet interconnect 1800 in ILCN4, are transmitted to protocol handler 4700-1 in IMLCN8 on the inter-module channel. Packets received by protocol handler 4700-1 in IMLCN8 from the inter-module channel, are transmitted via packet interconnect 4800 in ILCN3 to protocol handler 4700-0. Finally, packets received by protocol handler 4700-0 in ILCN3 from packet interconnect 4800, are transmitted in LCN2 to user terminal 4001. In the reverse direction, data packets received by protocol handler 4700-0 from LCN2 of user terminal 4001, are transmitted via packet interconnect 4800 in ILCN14 to protocol handler 4700-1. Packets received by protocol handler 4700-1 from packet interconnect 4800 in ILCN14, are transmitted to protocol handler 1700-1 in IMLCN3 on the inter-module channel. Packets received by protocol handler 1700-1 in IMLCN3 from the inter-module channel, are transmitted via packet interconnect 1800 in ILCN9 to protocol handler 1700-0. To complete the connection, packets received by protocol handler 1700-0 in ILCN9 from packet interconnect 1800, are transmitted in LCN2 to user terminal 1001.

Figure 19:
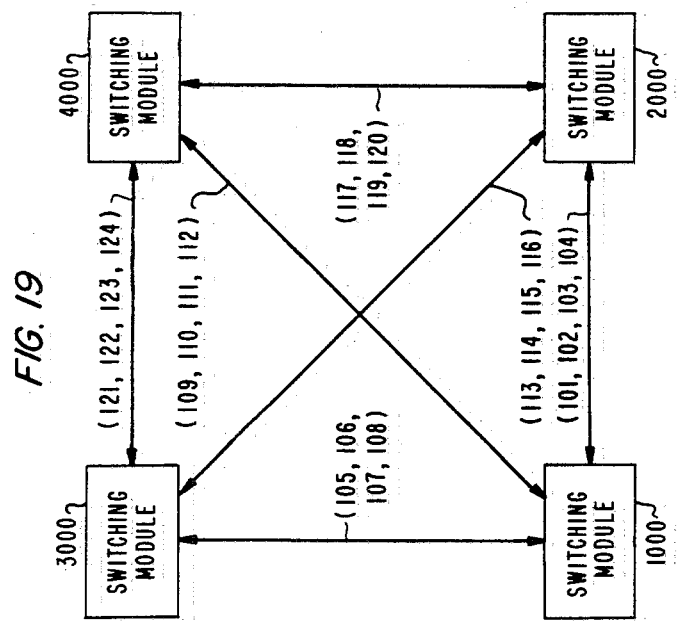
FIG. 19 is a diagram illustrating a directly-connected, mesh topology used to interconnect four switching modules of the system of FIG. 1 through 3 for inter-module packet traffic.

In the present embodiment, the switching modules 1000, 2000, 3000 and 4000 are interconnected with respect to packet traffic, in a directly-connected or mesh topology (FIG. 19). Each pair of switching modules uses four time-multiplexed switch 10 channels for packet communication between the modules. For example, packets are conveyed between switching modules 1000 and 2000 using time-multiplexed switch 10 channels 101 through 104 (as indicated in FIG. 19 by the numbers above the line between modules 1000 and 2000). Twelve time-multiplexed switch 10 channels from each switching module are used for intermodule packet traffic.

Operator Services

One or more of the switching modules, e.g., module 1000, of the system can be used to interface with telephone operator position terminals to provide operator services such as directory assistance and toll and assistance service, to customers served by the other switching modules of the system. For example, if switching module 1000 is used to provide such operator services, and the user terminals connected to module 1000, e.g., terminals 1001 and 1002, are operator position terminals, a digital conference circuit is connected to time-slot interchange unit 1011 to bridge available operator position terminals with subscriber sets or user terminals either directly connected to other switching modules or connected from other switching systems via digital or analog trunks. For example, a calling party, e.g., subscriber set 23, is connected via line unit 19, time-slot interchange unit 11, time-multiplexed switch 10 and time-slot interchange unit 1011 to the digital conference circuit. The called party, e.g., user terminal 4001, is connected via digital line unit 4101, time-slot interchange unit 4011, time-multiplexed switch 10 and time-slot interchange unit 1011 to the digital conference circuit. The operator position terminal, i.e., user terminal 1001, is connected via digital line unit 1101 and time-slot interchange unit 1011 to the digital conference circuit to bridge an operator with the calling and called parties. The message signaling between terminal 1001 and control unit 1017 includes keystroke messages transmitted by terminal 1001 in response to the depression of the various functional keys on terminal 1001 used in the provision of operator services. The general principles concerning the provision of operator services are described in issues of the *Bell System Technical Journal* of December 1970, July-August 1979 and March 1983.

First Alternative Embodiment

Figure 20:
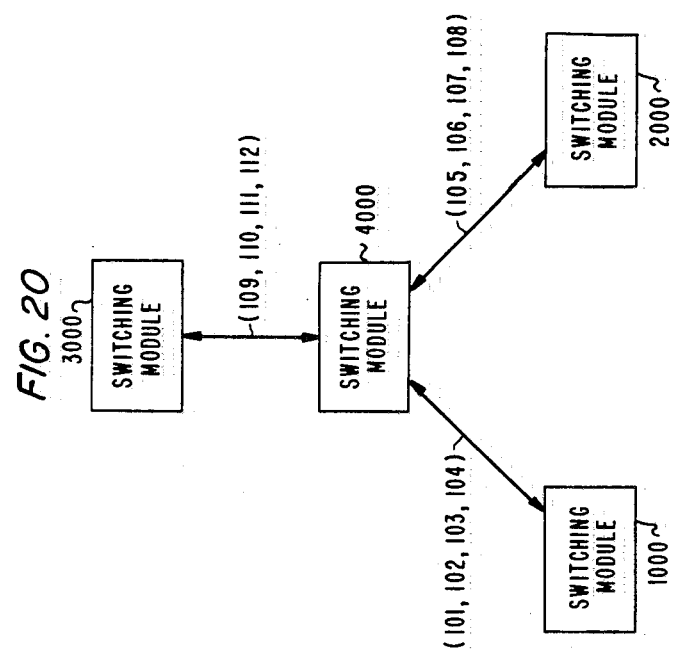
FIG. 20 is a diagram illustrating a star topology used to interconnect four switching modules for inter-module packet traffic in a first alternative embodiment of the invention.

In a first alternative embodiment, the switching modules 1000, 2000, 3000 and 4000 are interconnected with respect to packet traffic, in the star topology of FIG. 20. Each switching module 1000, 2000 and 3000 does intra-module packet switching and uses four time-multiplexed switch 10 channels to switch packets to and from switching module 4000. Switching module 4000 also does intra-module packet switching but uses four time-multiplexed switch 10 channels to each of the switching modules 1000, 2000 and 3000 to convey packets and performs packet switching for inter-module packet calls among modules 1000, 2000, 3000 and 4000. Alternatively, switching module 4000 could be used solely for intermodule packet switching. Under some circumstances, e.g., in systems requiring many such modules, the implementation of the star topology of FIG. 20 uses the circuit switching resources of time-multiplexed switch 10 more efficiently than a similar implementation of the mesh topology of FIG. 19. However, use of the star topology may increase the total packet transmission delay.

Second Alternative Embodiment

In a second alternative embodiment, a packet switching ring network 5000, is added to the system of FIG. 1 through 3 to switch both inter-module and intramodule packet calls. An example of such a network is the network of the Western Electric No. 1 PSS system described the paper, "No. 1 PSS: Number One Packet Switching System Service Capabiliries and Architecture" by J. C. Ehlinger and R. W Stubblefield published in the record of the *IEEE conference on Communications: Integrating Communication for World Progress* (*ICC* '83) held in June 1983. FIG. 21 shows only the additions and changes to the system of FIG. 1 through 3 for this second alternative embodiment. The packet switching units 1400, 2400, 3400 and 4400 represent the packet switching units in the switching modules 1000, 2000, 3000 and 4000, respectively, of FIG. 1 through 3. Central control 30, in addition to the communication link 32 (FIG. 3) has a second communication link 5005 (FIG. 21) used to control ring network 5000. Each of the packet switching units is connected to ring network 5000 by means of a plurality of digital transmission facilities 5002, e.g., the 24-channel T1 carrier system disclosed in the J. H. Green et. al., U.S. Pat. No. 4,059,731. A given transmission facility 5002 is interfaced to ring network 5000 via a digital facility interface 5003 and to a given packet switching unit via a digital facility interface 5001. Each digital facility interface 5001 is connected via a 32-channel bidirectional data bus 5004 to one of the data fanout unit included in the packet switching unit. However only 24 of the 32 bus 5004 channels are used. In packet switching unit 1400, for example, each protocol handler is associated with one channel on one of the facilities 5002. The protocol handlers respond to signaling packets from user terminals by switching those packets to control unit -1017 (FIG. 2) as before. However, the protocol handlers respond to data packets by transmitting them on the associated facility 5002 channels at a 64 kilobits per second rate. Ring network 5000 determines by communicating with central control 30, the appropriate channels of the facilities 5002 in which the data packets are to be returned such that they are received by the correct destination protocol handlers to be switched to the destination user terminals. Virtual circuits are established in ring network 5000 between the incoming channels of the facilities 5002 and the outgoing channels thus determined.

It is to be understood that the above-described embodiments are merely illustrative of the principles of the present invention and that other embodiments may be devised by those skilled in the art without departing from the spirit and scope of the invention. For example, although in the described embodiments, the user terminals access the switching system via the four-wire CCITT, T-interface using a 2B+D format (two 64 kilobits per second circuit-switched B-channels and one 16 kilobits per second packet-switched D-channel), other methods of user access are contemplated. For example, user terminals can achieve access via a two-wire line (denoted by the CCITT as the (U-interface) using the same 2B+D format. Digital transmission facilities such as the T1 carrier system of the above-cited Green et. al. U.S. Pat. No. 4,059,731 can be used to provide user access via digital PBX's in, for example, a 23B+D format (twenty-three, 64 kilobits per second circuit-switched B-channels and one 64 kilobits per second packet-switched D-channel) or via remote switching entities such as the remote switching module described in U.S. Pat. No. 4,550,404, issued to M. Chodrow et al. on Sept. 24, 1985 digital loop carrier remote terminals where a variable number of 2B+D formats are multiplexed on a T1 carrier system. In addition, in the above-described embodiments the communication links between user terminals and protocol handlers implement the well-known HDLC link-level protocol. Many other link-level protocols could be used. Furthermore, different protocols could be used to communicate with different user terminals. It is also to be understood that user B-channels can be used as packet-switched channels rather than as circuit-switched channels. If user B-channels are used as packet-switched channels in the system of FIG. 1 through 3, such B-channels can be connected to packet switching unit 4400 either directly or via circuit-switched channels of time-slot interchange unit 1011. Further, although the system as shown in FIG. 1 through 3 includes only line units, it is to be understood that analog or digital trunk units interfacing with trunks from other switching systems may also be included.

What is claimed is:

1. A switching system comprising
a plurality of switching modules each associated with a corresponding plurality of user terminals and inter-module connection means,
each said switching module comprising circuit switching means for providing circuit-switched communication channels among its associated user terminals and between its associated user terminals and said intermodule connection means, and packet switching means connectible to said inter-module connection means for providing packet-switched communication channels among its associated user terminals and between its associated user terminals and said inter-module connection means,
said inter-module connection means comprising means for interconnecting the circuit switching means of each of said switching modules for inter-module circuit-switched communication, and means for interconnecting the packet switching means of each of said switching modules for inter-module packet-switched communication.

2. A switching system in accordance with claim 1,
each said switching module further comprising means for coupling said packet switching means to said circuit switching means and
said circuit switching means further comprising means for providing predetermined communication channels between said coupling means and said inter-module connection means.

3. A switching system comprising
a plurality of switching modules each associated with a corresponding plurality of user terminals and inter-module connection means,
each said switching module comprising circuit switching means for providing circuit-switched communication channels among its associated user terminals and between its associated user terminals and said intermodule connection means, and packet switching means comprising a plurality of packet switching nodes, at least a predetermined one of said nodes connectible to said inter-module connection means and certain ones of said nodes connectible to its associated user terminals, said packet switching means further comprising packet interconnect means for interconnecting said nodes to provide packet-switched communication channels among its associated user terminals and between its associated user terminals and the predetermined node of that switching module,
said inter-module connection means comprising means for interconnecting the circuit switching means of each of said switching modules to provide circuit-switched communication channels between user terminals associated with different ones of said switching modules, and means for interconnecting the predetermined nodes of said switching modules to provide packet-switched communication channels between user terminals associated with different ones of said switching modules.

4. A switching system in accordance with claim 3, said means for interconnecting the predetermined nodes of said switching modules comprising means for connecting the predetermined node of each one of said switching modules to the predetermined node of each of the other ones of said switching modules.

5. A switching system in accordance with claim 3, said means for interconnecting the predetermined nodes of said switching modules further comprising means for connecting the predetermined node of a given one of said switching modules to the predetermined nodes of other ones of said switching modules.

6. A switching system in accordance with claim 3, said circuit switching means further comprising means for providing communication channels between the predetermined node of that switching module and said inter-module connection means.

7. A switching system in accordance with claim 3,
each of said nodes comprising means for transmitting request signals to said packet interconnect means,
said packet interconnect means comprising means for generating selection signals each defining one of said nodes, and means responsive to a request signal from a given one of said nodes and to a generated selection signal defining said given node, for transmitting a clear signal to said given node,
each of said nodes further comprising means responsive to a clear signal from said packet interconnect means for transmitting a packet to said packet interconnect means.

8. A switching system in accordance with claim 7, said packet interconnect means further comprising means for broadcasting packets received from any one of said nodes, to other ones of said nodes.

9. A switching system in accordance with claim 7,
each of said nodes further comprising means for transmitting, for each packet transmitted by that node, an associated clock signal defining bits of that packet, to said packet interconnect means,
said packet interconnect means further comprising means for broadcasting packets and associated clock signals received from any one of said nodes, to other ones of said nodes,
each of said nodes further comprising means for receiving bits of packets from said packet interconnect means as defined by the associated clock signals received from said packet interconnect means.

10. A switching system in accordance with claim 3, each said switching module further comprising sequencing means for sequentially enabling each of said nodes to transmit information to said packet interconnect means.

11. A switching system in accordance with claim 10, each of said nodes comprising means for transm,itting request signals, said sequencing means further comprising clock means for generating clock signals, counter means responsive to said clock signals for generating selection signals each defining one of said nodes, multiplexer means responsive to a given one of said selection signals for transmitting a request signal received from the one of said nodes defined by said given selection signal, to said counter means to disable the further generation of selection signals, and to demultiplexer means, said demultiplexer means being responsive to said given selection signal and to said request signal received from said multiplexer means, for transmitting a clear signal to said one of said nodes defined by said given selection signal, each of said nodes further comprising means responsive to a clear signal from said demultiplexer means for transmitting a packet to said packet interconnect means.

12. A switching system in accordance with claim 3 further comprising, for each of said switching modules, a plurality of user access lines for connecting the user terminals associated with that switching module to the circuit switching means and to the packet switching means of that switching module and wherein, for each of said switching modules, each of said certain ones of said nodes comprises memory means for storing packets, a plurality of protocol processing means each associated with a unique one of said user access lines and each comprising means for receiving first packets from the associated user access line in accordance with a given protocol and transmitting said first packets to said memory means for storage, and means for reading other packets from said memory means and transmitting said other packets in accordance with said given protocol to the associated user access line and a communications controller comprising means for receiving said other packets from said packet interconnect means and transmitting said other packets to said memory means for storage and means for reading said first packets from said memory means and transmitting said first packets to said packet interconnect means.

13. A switching system in accordance with claim 12, each said switching module further comprising control means for generating assignment signals defining the association of said user access lines with said protocol processing means and means coupled to said control means and responsive to said assignment signals for connecting each of said user access lines to the associated one of said protocol processing means as defined by said assignment signals.

14. A switching system comprising time-multiplexed switching means for completing communication paths between a plurality of input ports and a plurality of output ports in time slots of substantially fixed duration, first circuit switching means for providing circuit-switched communication channels among a first plurality of user terminals and a given one of said input ports, first packet switching means comprising a first intermediate packet switching node connected to said given input port, a first plurality of user packet switching nodes each connectible to associated ones of said first plurality of user terminals, and first packet interconnect means for interconnecting said first intermediate packet switching node and each of said first plurality of user packet switching nodes for providing packet-switched communication channels among said first plurality of user terminals and said first intermediate packet switching node, second circuit switching means for providing circuit-switched communication channels among a second plurality of user terminals and a given one of said output ports and second packet switching means comprising a second intermediate packet switching node connected to said given output port, a second plurality of user packet switching nodes each connectible to associated ones of said second plurality of user terminals, and second packet interconnect means for interconnecting said second intermediate packet switching node and each of said second plurality of user packet switching nodes for providing packet-switched communication channels among said second plurality of user terminals and said second intermediate packet switching node.

15. A switching system in accordance with claim 14 wherein said first intermediate packet switching node comprises means for transmitting information received from said first packet interconnect means, to said given input port, wherein said second intermediate packet switching node comprises means for transmitting information received from said given output port, to said second packet interconnect means and wherein said switching system further comprises means for controlling said time-multiplexed switching means to complete a communication path between said given input port and said given output port during predetermined ones of said time slots, means for conveying information transmitted by said first intermediate packet switching node, to said given input port during said predetermined time slots and, means for conveying information received from said given output port during said predetermined time slots, to said second intermediate packet switching node.

16. A switching system comprising time-multiplexed switching means for completing communication paths between a plurality of input ports and a plurality of output ports in time slots of substantially fixed duration, a plurality of packet switching units each associated with a corresponding plurality of user terminals and each comprising an intermediate packet switching node connected to an associated one of said input ports and to an associated one of said output ports, a plurality of user packet switching nodes each connectible to certain ones of the user terminals associated with that packet switching unit, and packet interconnect means for interconnecting the intermediate packet switching node and the user packet switching nodes of that packet switching unit for providing packet-switched communication channels between the user terminals associated with that packet switching unit and between the user terminals associated with that packet switching unit and the intermediate packet switching node of that packet swit unit and means for controlling said time-multiplexed switching means to complete communication paths between the ones of said input ports associated with said packet switching units and the ones of said output ports associated with said packet switching units during predetermined ones of said time slots to allow communication among the intermediate packet switching nodes of said packet switching units for providing packet-switched communication channels between the user terminals associated with one of said packet switching units and the user terminals associated with other ones of said packet switching units.

17. A switching system comprising a plurality of switching modules each associated with a corresponding plurality of user terminals and each comprising circuit switching means for providing circuit-switched communication channels among the user terminals associated with that switching module, control means for controlling the establishment of circuit-switched communication channels by said circuit switching means and packet switching means comprising an intermediate packet switching node, a plurality of user packet switching nodes each connectible to certain ones of the user terminals associated with that switching module, a control packet switching node connected to said control means, and packet interconnect means for interconnecting said intermediate packet switching node, each of said plurality of user packet switching nodes, and said control packet switching node, for providing packet-switched communication channels between the user terminals associated with that switching module and between the user terminals associated with that switching module and the intermediate packet switching node of that switching module and for providing signaling channels between the user terminals associated with that switching module and the control packet switching node of that switching module;

means for interconnecting the circuit switching means of said switching modules for providing circuit-switched communication channels between the user terminals associated with one of said switching modules and the user terminals associated with other ones of said switching modules; and means for interconnecting the intermediate packet switching nodes of said switching modules for providing packet-switched communication channels between the user terminals associated with one of said switching modules and the user terminals associated with other ones of said switching modules.

18. A Switching system comprising a plurality of switching modules each associated with a corresponding plurality of user terminals,
inter-module connection means and
a packet switching network,
each said switching module comprising (a) circuit switching means for providing circuit-switched communication channels among its associated user terminals and between its associated user terminals and said inter-module connection means, (b) control means for controlling the establishment of circuit-switched communication channels by said circuit switching means and (c) packet switching means comprising a plurality of packet switching nodes, certain ones of said nodes connectible to said associated user terminals and also connectible to said packet switching network, and at least one of said nodes connected to said control means, said packet switching means further comprising packet interconnect means for connecting each of said certain ones of said nodes to said node connected to said control means for providing signaling channels between each of said associated user terminals and said control means, each of said certain ones of said nodes comprising means for transmitting to said control means, signaling packets received from said associated user terminals, and means for transmitting to said packet switching network, data packets received from said associated user terminals.

19. A switching system in accordance with claim 18, each of said nodes comprising means for transmitting request signals to said packet interconnect means, said packet interconnect means comprising means for generating selection signals each defining one of said nodes, and means responsive to a request signal from a given one of said nodes and to a generated selection signal defining said given node, for transmitting a clear signal to said given node, each of said nodes further comprising means responsive to a clear signal from said packet interconnect means for transmitting a packet to said packet interconnect means.

20. A switching system in accordance with claim 18, each said switching module further comprising sequencing means for sequentially enabling each of said nodes to transmit information to said packet interconnect means.

21. A switching system in accordance with claim 20, each of said nodes comprising means for transmitting request signals, said sequencing means further comprising clock means for generating clock signals, counter means responsive to said clock signals for generating selection signals each defining one of said nodes, multiplexer means responsive to a given one of said selection signals for transmitting a request signal received from the one of said nodes defined by said given selection signal, to said counter means to disable the further generation of selection signals, and to demultiplexer means, said demultiplexer means being responsive to said given selection signal and to said request signal received from said multiplexer means, for transmitting a clear signal to said one of said nodes defined by said given selection signal and each of said nodes further comprising means responsive to a clear signal from said demultiplexer means for transmitting a packet to said packet interconnect means.

22. A switching system comprising a plurality of switching modules and a time-multiplexed switch coupled to said modules for providing communication paths for user terminals connected to said modules;

each of said modules comprising circuit switching means for providing circuit-switched communication channels among user terminals coupled to said circuit switching means, packet switching means having a plurality of switching nodes, and control means individual to each of said modules for controlling said circuit switching means and said packet switching means; and means coupling a first portion of said nodes to said user terminals and a second portion of said nodes to said time-multiplexed switch;

said packet switching means effective when enabled in a first mode for providing packet-switched communication channels among said first position nodes for intra-module communication and effective when enabled in a second mode for providing packet-switched communication channels between said first and second portion nodes for providing inter-module communication channels via said time-multiplexed switch.

* * * * *